US012678768B2

(12) United States Patent
Neagu

(10) Patent No.: US 12,678,768 B2
(45) Date of Patent: Jul. 14, 2026

(54) PACKAGE OF A TOBACCO OR NICOTINE CONTAINING PRODUCT COMPRISING A MOISTURE REGULATING PRODUCT

(71) Applicant: PHILIP MORRIS PRODUCTS S.A., Neuchatel (CH)

(72) Inventor: Cristian Neagu, Epalinges (CH)

(73) Assignee: Philip Morris Products S.A., Neuchatel (CH)

( * ) Notice: Subject to any disclaimer, the term of this patent is extended or adjusted under 35 U.S.C. 154(b) by 719 days.

(21) Appl. No.: 17/923,840

(22) PCT Filed: May 4, 2021

(86) PCT No.: PCT/EP2021/061753
§ 371 (c)(1),
(2) Date: Nov. 7, 2022

(87) PCT Pub. No.: WO2021/224277
PCT Pub. Date: Nov. 11, 2021

(65) Prior Publication Data
US 2023/0173457 A1 Jun. 8, 2023

(30) Foreign Application Priority Data
May 8, 2020 (EP) .................................... 20173776

(51) Int. Cl.
*B01J 20/22* (2006.01)
*A24F 23/00* (2006.01)
(Continued)

(52) U.S. Cl.
CPC ............. *B01J 20/226* (2013.01); *A24F 23/00* (2013.01); *B01J 20/043* (2013.01);
(Continued)

(58) Field of Classification Search
None
See application file for complete search history.

(56) References Cited

U.S. PATENT DOCUMENTS 1,871,419 A 8/1932 McKee
2,580,050 A 12/1951 Sparks
(Continued)

FOREIGN PATENT DOCUMENTS

CN 106586068 4/2017
CN 107427064 12/2017
(Continued)

OTHER PUBLICATIONS

N.D. Kornienko et al., Analysis of the Effect of the Chemical Composition of Cellulose Composite Materials on the Moisture Strength Characteristics of Packaging Cardboard, Modern Science-Intensive Technologies, 2015, No. 9, pp. 43-45.
(Continued)

*Primary Examiner* — Thomas J Kessler
(74) *Attorney, Agent, or Firm* — Mueting Raasch Group

(57) ABSTRACT

Package of a tobacco or nicotine containing product comprising a packaging material having a moisture regulating product, the moisture regulating product comprising at least one metal-organic framework compound and at least an inorganic salt.

20 Claims, 4 Drawing Sheets

(51) Int. Cl.

| | |
|---|---|
| *B01J 20/04* | (2006.01) |
| *B01J 20/28* | (2006.01) |
| *B01J 20/32* | (2006.01) |
| *B65D 81/26* | (2006.01) |

(52) U.S. Cl.
CPC ..... *B01J 20/2803* (2013.01); *B01J 20/28045* (2013.01); *B01J 20/3223* (2013.01); *B01J 20/3265* (2013.01); *B65D 81/264* (2013.01)

(56) References Cited

U.S. PATENT DOCUMENTS

| | | | | |
|---|---|---|---|---|
| 2,595,911 | A | 5/1952 | Young | |
| 2,760,884 | A | 8/1956 | Graf, Jr. | |
| 2,945,398 | A | 7/1960 | Mullarkey | |
| 4,117,199 | A | 9/1978 | Gotoh | |
| 9,809,372 | B2 | 11/2017 | Sebastian | |
| 10,384,862 | B2 | 8/2019 | Sebastian | |
| 10,472,150 | B2 | 11/2019 | Sebastian | |
| 11,584,575 | B2 | 2/2023 | Siitonen | |
| 2007/0193896 | A1 | 8/2007 | Tanbo | |
| 2019/0185705 | A1 | 6/2019 | Wengeler | |
| 2021/0169137 | A1* | 6/2021 | McClanahan | A24B 13/00 |

FOREIGN PATENT DOCUMENTS

| | | | | |
|---|---|---|---|---|
| CN | 110 269 272 | 9/2019 | | |
| CN | 110637123 | 12/2019 | | |
| EP | 0 348 840 | 1/1990 | | |
| EP | 0688793 | 12/1995 | | |
| EP | 2856867 | 4/2015 | | |
| KR | 20130135882 A | * | 12/2013 | ........ B01D 67/0079 |
| WO | WO 98/57321 | 12/1998 | | |
| WO | WO 2016/037043 | 3/2016 | | |
| WO | WO 2019058276 | 3/2019 | | |
| WO | WO 2019/228356 | 12/2019 | | |

OTHER PUBLICATIONS

Office Action issued in China for Application No. 202180032089.8 dated Jan. 11, 2025 (30 pages). English translation included.

PCT International Search Report and Written Opinion for PCT/EP2021/061753 dated Oct. 8, 2021 (19 pages).

Office Action issued in Russia for Application No. 2022131911/04 dated Jan. 22, 2025 (18 pages). English translation included.

Extended European Search Report for Application No. 20173776.4 dated Mar. 10, 2021 (10 pages).

* cited by examiner

1

PACKAGE OF A TOBACCO OR NICOTINE CONTAINING PRODUCT COMPRISING A MOISTURE REGULATING PRODUCT

This application is a U.S. National Stage Application of International Application No. PCT/EP2021/061753 filed May 4, 2021, which was published in English on Nov. 11, 2021, as International Publication No. WO 2021/224277 A2. International Application No. PCT/EP2021/061753 claims priority to European Application No. 20173776.4 filed May 8, 2020.

The invention relates to a package of a tobacco or nicotine containing product provided with moisture regulating product.

The invention relates to a package of a tobacco or nicotine containing product provided with a packaging material having a moisture regulating product.

A lot of products are produced or packaged with certain level of relative humidity, but over time they tend to adsorb humidity from the environment. The adsorption of humidity damages the properties of the product. The organoleptic properties and also the physical properties of a product are degraded by an increase of the moisture content of the product.

In particular tobacco or nicotine containing products retain freshness, or perception of freshness at a desired moisture content of the product.

Tobacco or nicotine containing products keeps their organoleptic features at a certain level of moisture content.

It is therefore necessary to keep the moisture content of the tobacco or nicotine containing products at a certain desired level for preserving the quality of the tobacco or nicotine containing products until the final use of the products.

It is necessary to preserve the quality of the tobacco or nicotine containing products to preserve the experience of the consumer and the satisfaction of the consumer.

It is necessary to control the moisture content of the tobacco or nicotine containing products throughout shipping, distribution, shelf-life and product usage life for optimising the property of the tobacco or nicotine containing products until the final use.

It is desired to control the moisture content of the tobacco or nicotine containing products before the first opening by the consumer and also during the use and until the last unit of the tobacco or nicotine containing products remains in the package.

In order to reduce the adsorption of humidity and to achieve a desired shelf-life, many different packaging solutions provided with different barrier materials for reducing the adsorption of humidity have been proposed.

On the other side, it is also necessary to avoid a too high desiccation of the product packaged in the package, which would also damage the properties of the product.

It is necessary to keep the relative humidity of a package of a tobacco or nicotine containing product within a desired range in order to optimise the property of the tobacco or nicotine containing product and the experience for the consumer.

In a first aspect the invention provides a package of a tobacco or nicotine containing product comprising a packaging material having a moisture regulating product wherein the moisture regulating product comprises at least one Metal-organic framework compound.

The package of the invention adsorbs water at a defined range of relative humidity and allows the relative humidity of the package to be kept in a desired range.

The package of the invention allows the moisture content of the tobacco or nicotine containing product to be kept in a desired range.

It is thus avoided that the customers have a bad experience, either because the water content of the tobacco or nicotine containing product is increased over a certain level or because the moisture content of the tobacco or nicotine containing product is too low. In both cases the quality of the smoke of the aerosol produced is in fact impaired.

It is possible to keep the moisture content of the tobacco or nicotine containing product within a predefined range, thus optimising the organoleptic properties of the tobacco or nicotine containing product and the experience for the consumer of the tobacco or nicotine containing product.

The packaging material may be integrated into the package. It is thus avoided to add an additional element to the package.

The packaging material containing the moisture regulating product may also be inserted in a desired positon of the package. The user may be more satisfied as relying on a high quality product.

The moisture regulating product may comprise a plurality of Metal-organic framework compounds.

The moisture regulating product may further comprise a binder bounded to the at least one Metal-organic framework compound.

The binder improves the coupling of the at least one metal-organic framework with the packaging material. The binder promotes the adsorption helping the water to reach the at least one Metal-organic framework so as to enhance the adsorption of water from the at least one Metal-organic framework. The binder also avoids that the adsorption capacity of the at least one Metal-organic framework is impaired.

The moisture regulating product may comprise: 20-60 weight percent on total dry weight basis of the least one Metal-organic framework compound and 80-40 weight percent on total dry weight basis of the least one binder material.

The at least one binder of the moisture regulating product may be chosen in a group comprising: starch (($C_6H_{10}O_5$)n-($H_2O$)), Carboxyl Methyl Cellulose (CMC, $C_6H_7O_2$(OH)$_2CH_2COONa$), alginic acids (($C_6H_8O_6$)n), alginates, copolymers of polyacrylic acid (($C_3H_4O_2$)n), copolymers of methacrylic acid ($C_4H_6O_2$), polymers and/or copolymers of maleic acid ($HO_2CCH$=$CHCO_2H$), polyaspartic acid (($C_4H_5NO_3$)n), hydroxyethylcellulose ($C_{29}H_{52}O_{21}$), hydroxypropylcellulose ($C_{36}H_{70}O_{19}$), polyvinylalcohol (($C_2H_4O$)$_x$), polyvinylalcohol-co-ethylene (EVOH, $C_4H_8O$), polyvinylalcohol-co-vinyl acetate, polyethylene oxide ((—$CH_2CH_2O$-)n), polyethyleneoxide-co-propyleneoxide.

The moisture regulating product may comprise a plurality of binders bounded to the at least one Metal-organic framework compound.

The moisture regulating product may further comprise at least one inorganic salt.

The inorganic salt increases the efficiency of the moisture regulating product. The regulation of the relative humidity of the package of a tobacco or nicotine containing product is improved and better adjusted.

The moisture regulating product may comprise a plurality of inorganic salts.

The at least one inorganic salt may be chosen in a group comprising carbonates, natrium chloride, calcium chloride.

The at least one inorganic salt may be Potassium Carbonate.

The moisture regulating product may comprise: 20-60 weight percent on total dry weight basis of the least one Metal-organic framework compound and of the least one inorganic salt and 80-40 weight percent on total dry weight basis of the least one binder material.

The package of the invention adsorbs water at a defined range of relative humidity.

By properly adjusting the weight percent of the at least one Metal-organic framework and/or the weight percent of the at least one inorganic salt, and/or the weight percent of the at least one binder in the moisture regulating product, it is possible to adjust the relative humidity of the package within a desired range. It is thus possible to adjust the moisture content of the tobacco or nicotine containing product within a desired range.

By properly choosing the at least one Metal-organic framework, and/or the at least one binder, and/or the at least one inorganic salt in the moisture regulating product, it is possible to adjust the relative humidity of the package within a desired range. It is thus possible to adjust the moisture content of the tobacco or nicotine containing product within a desired range.

It is thus avoided an undesired increase of the moisture content in the tobacco or nicotine containing product over a desired range.

It is thus avoided, an undesired decrease of the moisture content of the tobacco or nicotine containing product below a desired range.

The deterioration of the tobacco or nicotine containing product is thus avoided and the quality of the tobacco or nicotine containing product is preserved.

In a second aspect of the invention it is provided a package of a tobacco or nicotine containing product comprising a packaging material having a moisture regulating product wherein the moisture regulating product comprises at least one carbonate.

It is possible to keep the moisture content of the tobacco or nicotine containing product within a predefined range, thus optimising the organoleptic properties of the tobacco or nicotine containing product and the experience for the consumer of the tobacco or nicotine containing product.

The moisture regulating product may further comprise at least one binder bounded to the at least one carbonate.

The provision of the binder allows the adsorption efficiency to be increased and the adsorbing capacity to be increased.

The moisture regulating product may comprise about 70-80 weight percent on total dry weight basis of the at least one carbonate salt and about 30-20 weight percent on total dry weight basis of at least one binder.

The moisture regulating product may comprise about 75 weight percent on total dry weight basis of the at least one carbonate and about 25 weight percent on total dry weight basis of at least one binder.

The at least one carbonate may be Potassium Carbonate.

The moisture regulating product may comprise a plurality of carbonates.

The moisture regulating product may further comprise Natrium Chloride, Calcium Chloride, The at least one binder of the moisture regulating product may be chosen in a group comprising: starch $((C_6H_{10}O_5)n\text{-}(H_2O))$, Carboxyl Methyl Cellulose (CMC, $C_6H_7O_2(OH)_2CH_2COONa$), alginic acids $((C_6H_8O_6)n)$, alginates, copolymers of polyacrylic acid $((C_3H_4O_2)n)$, copolymers of methacrylic acid $(C_4H_6O_2)$, polymers and/or copolymers of maleic acid $(HO_2CCH=CHCO_2H)$, polyaspartic acid $((C_4H_5NO_3)n)$, hydroxyethylcellulose $(C_{29}H_{52}O_{21})$, hydroxypropylcellulose $(O_{36}H_{70}O_{19})$, polyvinylalcohol $((C_2H_4O)_x)$, polyvinylalcohol-co-ethylene (EVOH, $C_4H_8O$), polyvinylalcohol-co-vinyl acetate, polyethylene oxide $((-CH_2CH_2O\text{-})n)$, polyethyleneoxide-co-propylene-oxide.

The package of the invention adsorbs water at a defined range of relative humidity and the relative humidity inside the package of the invention may be kept in a desired range.

The package of the invention allows the moisture content of the tobacco or nicotine containing product to be kept in a desired range.

The moisture regulating product may comprise a plurality of binders chosen in the group indicated above.

According to a third aspect of the invention it is provided a method for preparing a packaging material of a package of a tobacco or nicotine containing product, wherein the packaging material comprises a moisture regulating product and wherein the moisture regulating product comprises at least one Metal-organic framework and at least one binder bounded to the at least one Metal-organic framework, the method comprising the following steps:

providing a packaging material;

providing an impregnating bath containing a moisture regulating solution having a moisture regulating product comprising 20-60 weight percent on total dry weight basis of at least one Metal-organic framework compound and 80-40 weight percent on total dry weight basis of at least one binder material and a solvent;

immersing the packaging material into the impregnating bath until the packaging material is uniformly saturated with the moisture regulating solution of the impregnating bath and drying the packaging material to evaporate the solvent from the packaging material so as to obtain a packaging material comprising the at least one Metal-organic framework exhibiting a moisture content which would be in equilibrium at the temperature of 23 Celsius and the pressure of 1 atmosphere with a mixture air-water characterized by a relative humidity comprised between about 0 and 25 percent, according to the corresponding sorption isotherm of the at least one Metal-organic framework.

In the drying step the packaging material may be dried to obtain a packaging material comprising the at least one Metal-organic framework exhibiting a moisture content which would be in equilibrium at the temperature of 23 Celsius and the pressure of 1 atmosphere with a mixture air-water characterized by a relative humidity comprised between about 0 and 20 percent, according to the corresponding sorption isotherm of the at least one Metal-organic framework.

In the drying step the packaging material may be dried to obtain a packaging material comprising the at least one Metal-organic framework exhibiting a moisture content which would be in equilibrium at the temperature of 23 Celsius and the pressure of 1 atmosphere with a mixture air-water characterized by a relative humidity comprised between about 0 and 10 percent, according to the corresponding sorption isotherm of the at least one Metal-organic framework.

In the drying step the packaging material may be dried to obtain a packaging material comprising the at least one Metal-organic framework exhibiting a moisture content which would be in equilibrium at the temperature of 23 Celsius and the pressure of 1 atmosphere with a mixture air-water characterized by a relative humidity comprised between 0 and 5 percent, according to the corresponding sorption isotherm of the at least one Metal-organic framework.

In the drying step the packaging material is dried so as to obtain a packaging material having a moisture content which would be in equilibrium at the temperature of 23 Celsius and the pressure of 1 atmosphere with a mixture air-water having a relative humidity lower than the minimum threshold value of relative humidity in the corresponding sorption isotherm of the at least one Metal-organic framework.

According to a fourth aspect of the invention it is provided a method for preparing a packaging material of a package of a tobacco or nicotine containing product, wherein the packaging material comprises a moisture regulating product and wherein the moisture regulating product comprises at least one Metal-organic framework and at least one binder bounded to the at least one Metal-organic framework, the method comprising the following steps:

providing a packaging material;

providing an impregnating bath containing a moisture regulating solution having a moisture regulating product comprising 20-60 weight percent on total dry weight basis of at least one Metal-organic framework compound and 80-40 weight percent on total dry weight basis of at least one binder material and a solvent;

immersing the packaging material into the impregnating bath until the packaging material is uniformly saturated with the moisture regulating solution of the impregnating bath and drying the packaging material to evaporate the solvent from the packaging material so as to obtain a packaging material comprising the at least one Metal-organic framework exhibiting a moisture content comprised between about 0 weight percent and 25 weight percent based on the weight of the at least one Metal-organic framework without water.

In the drying step the packaging material is preferably dried to evaporate the solvent from the packaging material so as to obtain a packaging material comprising the at least one Metal-organic framework exhibiting a moisture content comprised between about 0 weight percent and 20 weight percent based on the weight of the at least one Metal-organic framework without water.

In the drying step the packaging material is more preferably dried to evaporate the solvent from the packaging material so as to obtain a packaging material comprising the at least one Metal-organic framework exhibiting a moisture content comprised between about 0 weight percent and 10 weight percent based on the weight of the at least one Metal-organic framework without water.

In the drying step the packaging material is most preferably dried to evaporate the solvent from the packaging material so as to obtain a packaging material comprising the at least one Metal-organic framework exhibiting a moisture content comprised between about 0 weight percent and 5 weight percent based on the weight of the at least one Metal-organic framework without water.

The moisture regulating solution may further comprise an inorganic salt, preferably a carbonate, more preferably Potassium Carbonate.

It is possible to obtain a packaging material and thus a package adsorbing humidity within a preferred range.

According to a fifth aspect of the invention it is provided a method for preparing a packaging material of a package of a tobacco or nicotine containing product, wherein the packaging material comprises a moisture regulating product and wherein the moisture regulating product comprises at least one carbonate and at least one binder bounded to the at least one carbonate, the method comprising the following steps:

providing a packaging material;

providing an impregnating bath of a moisture regulating solution containing a moisture regulating product comprising: 20-80 weight percentage on total dry weight basis of at least one carbonate and 80-20 weight percentage on total dry weight basis of at least one binder and a solvent;

immersing the packaging material into the impregnating bath until the packaging material is uniformly saturated with the moisture regulating solution of the impregnating bath and drying the packaging material to evaporate the solvent from the packaging material so as to obtain a packaging material comprising the at least one carbonate exhibiting a moisture content which would be in equilibrium at the temperature of 23 Celsius and the pressure of 1 atmosphere with a mixture air-water characterized by a relative humidity comprised between about 0 and 25 percent, according to the corresponding sorption isotherm of the at least one carbonate.

In the drying step the packaging material may be dried to obtain a packaging material comprising the at least one carbonate exhibiting a moisture content which would be in equilibrium at the temperature of 23 Celsius and the pressure of 1 atmosphere with a mixture air-water characterized by a relative humidity comprised between about 0 and 20 percent, according to the corresponding sorption isotherm of the at least one carbonate.

In the drying step the packaging material may be dried to obtain a packaging material comprising the at least one carbonate exhibiting a moisture content which would be in equilibrium at the temperature of 23 Celsius and the pressure of 1 atmosphere with a mixture air-water characterized by a relative humidity comprised between about 0 and 10 percent, according to the corresponding sorption isotherm of the at least one carbonate.

In the drying step the packaging material may be dried to obtain a packaging material comprising the at least one carbonate exhibiting a moisture content which would be in equilibrium at the temperature of 23 Celsius and the pressure of 1 atmosphere with a mixture air-water characterized by a relative humidity comprised between 0 and 5 percent, according to the corresponding sorption isotherm of the at least one carbonate.

The packaging material is dried so as to obtain a packaging material having a moisture content which would be in equilibrium at the temperature of 23 Celsius and the pressure of 1 atmosphere with a mixture air-water having a relative humidity lower than the minimum threshold value of relative humidity in the corresponding sorption isotherm of the at least one carbonate.

According to a sixth aspect of the invention it is provided a method for preparing a packaging material of a package of a tobacco or nicotine containing product, wherein the packaging material comprises a moisture regulating product and wherein the moisture regulating product comprises at least one carbonate and at least one binder bounded to the at least one carbonate, the method comprising the following steps:

providing a packaging material;

providing an impregnating bath of a moisture regulating solution containing a moisture regulating product comprising: 20-80 weight percentage on total dry weight basis of at least one carbonate, 80-20 weight percentage on total dry weight basis of at least one binder and a solvent;

immersing the packaging material into the impregnating bath until the packaging material is uniformly saturated with the moisture regulating solution of the impregnating bath and drying the packaging material to evaporate the solvent from the packaging material so as to obtain a packaging material comprising the at least one carbonate exhibiting a moisture content comprised between about 0 weight percent and 25 weight percent based on the weight of the at least one carbonate without water.

In the drying step the packaging material is preferably dried to evaporate the solvent from the packaging material so as to obtain a packaging material comprising the at least one carbonate exhibiting a moisture content comprised between about 0 weight percent and 20 weight percent based on the weight of the at least one carbonate without water.

In the drying step the packaging material is more preferably dried to evaporate the solvent from the packaging material so as to obtain a packaging material comprising the at least one carbonate exhibiting a moisture content comprised between about 0 weight percent and 10 weight percent based on the weight of the at least one carbonate without water.

In the drying step the packaging material is most preferably dried to evaporate the solvent from the packaging material so as to obtain a packaging material comprising the at least one carbonate exhibiting a moisture content comprised between about 0 weight percent and 5 weight percent based on the weight of the at least one carbonate without water.

The at least one carbonate may be Potassium Carbonate.

The moisture regulating solution may further comprise at least one Metal-organic framework. It is possible to obtain a packaging material and, thus, a package adsorbing humidity within a preferred range.

The package of the invention adsorbs water at a defined range of relative humidity.

By properly adjusting the weight percent of the at least one Metal-organic framework, and/or the weight percent of the at least one inorganic salt, and/or the weight percent of the at least one carbonate, and/or the weight percent of the at least one binder in the moisture regulating solution, it is possible to adjust the relative humidity of the package within a desired range. It is thus possible to adjust the moisture content of the tobacco or nicotine containing product within a desired range.

By properly choosing the at least one Metal-organic framework, and/or the at least one inorganic salt and/or the at least one binder, and/or the at least one carbonate in the moisture regulating solution, it is possible to adjust the relative humidity of the package within a desired range. It is thus possible to adjust the moisture content of the tobacco or nicotine containing product within a desired range.

It is avoided an undesired increasing of the moisture content in the product packaged in the package.

It is avoided, an undesired decrease of the moisture content of the product packaged in the package.

The relative humidity in the package is controlled and kept within a defined range. It is therefore possible to preserve the quality of a tobacco or nicotine containing product packed in the package.

Thanks to the invention it is thus possible to obtain a package for tobacco or nicotine containing product configured to keep the moisture content of the tobacco or nicotine product packed in the package within a predefined range.

The moisture regulating product adsorbs water in a defined relative humidity range, indicated as adsorption range in the following. In other words, the moisture regulating product adsorbs water in a defined range of relative humidity comprised between approximately a minimum threshold value of relative humidity and approximately a maximum threshold value of relative humidity.

The relative humidity range in which the moisture regulating product adsorbs water depends on the used Metal-organic framework or Metal-organic frameworks, on the used inorganic salt or inorganic salts, on the used carbonate or carbonates, on the used binder or binders in the moisture regulating product.

The moisture regulating product adsorbs only limited quantity of water below the minimum threshold value of relative humidity. The moisture regulating product adsorbs only limited quantity of water above the maximum threshold value of relative humidity.

The moisture regulating product adsorbs considerable quantity of water in a range of relative humidity between the minimum threshold value of relative humidity and the maximum threshold value of relative humidity. By choosing the Metal-organic framework or Metal-organic frameworks, the binder or binders, the inorganic salt or the inorganic salts, on the used carbonate or carbonates, the minimum threshold value of relative humidity and the maximum threshold value of relative humidity are adjusted and thus the relative humidity values of the adsorption range are adjusted.

It is thus possible to adjust the moisture content of the product packaged in the package.

By choosing the Metal-organic framework or Metal-organic frameworks, the binder or binders, the inorganic salt or the inorganic salts, the carbonate or the carbonates, it is possible to obtain a moisture regulating product tuned to adsorb a certain amount of water and within a certain absorption range comprised between a certain minimum threshold and a certain maximum threshold value of relative humidity.

Hence, by choosing the Metal-organic framework or Metal-organic frameworks, the binder or binders, the inorganic salt or the inorganic salts, the carbonate or the carbonates, and using the desired ratio in the moisture regulating product it is possible to obtain a moisture regulating product characterized by an S-shape in the sorption isotherm that fits the humidity range desired.

By choosing Metal-organic framework or Metal-organic frameworks, the binder or binders, the inorganic salt or the inorganic salts, the carbonate or the carbonates, it is adjusted the relative humidity range at which the moisture regulating product substantially adsorbs water.

Therefore, it is adjusted the relative humidity range inside the package and/or the moisture content range of the tobacco or nicotine containing product packed in the package comprising the moisture regulating product.

It is possible to control the moisture content of the tobacco or nicotine containing product in the package before the opening of the package and also during the use of the tobacco or nicotine containing product. It is possible to control the moisture content of the tobacco or nicotine containing product until the last unit of the tobacco or nicotine containing product remains in the package.

It is also possible to avoid a too high desiccation of the product in the package and also a too high moistening of the product in the package.

The organoleptic and physical properties of the tobacco or nicotine containing product are therefore preserved.

Choosing the Metal-organic framework or Metal-organic frameworks, the binder or binders, the inorganic salt or the inorganic salts, the carbonate or the carbonates, it is possible to obtain a moisture regulating product that is suitable for a particular tobacco or nicotine containing product keeping the moisture content of the tobacco or nicotine containing product within the level desired for that tobacco or nicotine containing product.

In the adsorption range the moisture regulating product adsorbs water with an efficiency depending on the used Metal-organic framework or Metal-organic frameworks, or on the used inorganic salt or inorganic salts, or on the used the carbonate or the carbonates, and on the used binder or binders.

In the adsorption range the amount of water adsorbed by the moisture regulating product depends on the used Metal-organic framework or Metal-organic frameworks, or on the used inorganic salt or inorganic salts, or on the used the carbonate or the carbonates, or on the used binder or binders.

At a defined temperature the adsorption behaviour of a compound is represented by a curve indicated as sorption isotherm, showing the change in the percent of water adsorbed/desorbed versus the percent of equilibrium relative humidity. The sorption isotherm is obtained at a certain temperature and pressure and indicates the percent of the water adsorbed by the moisture regulating product as a function of the percent equilibrium relative humidity.

The sorption isotherm of the moisture regulating product has a sigmoidal path, i.e. a curve resembling the shape of a "S".

The sorption isotherm of the moisture regulating product comprises a first portion comprised between zero relative humidity and the minimum threshold value of relative humidity. In the first portion the moisture regulating product adsorbs low quantities of water and the water adsorbed has a gradual increase in dependence of the relative humidity. The quantity of adsorbed water depends on the compounds in the moisture regulating product. The value of the minimum threshold value of relative humidity depends on the compounds of the moisture regulating product.

The sorption isotherm of the moisture regulating product comprises a second portion comprised between the maximum threshold relative humidity and about one hundred percent of relative humidity. In the second portion the moisture regulating product adsorbs low quantities of water and the water adsorbed has a gradual increase in dependence of the relative humidity. The quantity of adsorbed water depends on the compounds of the moisture regulating product. The value of maximum relative humidity depends on the compounds of the moisture regulating product.

The sorption isotherm of the moisture regulating product further comprises an adsorption portion comprised between the minimum threshold value of relative humidity and the maximum threshold value of relative humidity. In the adsorption portion the moisture regulating product adsorbs higher quantities of water in relation to the first portion or the second portion. In the adsorption portion the water adsorbed has a high increase in dependence of the relative humidity. The quantity of adsorbed water depends on the compounds of the moisture regulating product.

The minimum threshold value of relative humidity may be comprised between about 15 and 45 percent, at a temperature of about 23 Celsius and a pressure of 1 atmosphere. The minimum threshold value of relative humidity may be preferably comprised between about 20 and 40 percent, at a temperature of about 23 Celsius and a pressure of 1 atmosphere.

The maximum threshold value of relative humidity may be preferably comprised between 25 and 70 percent at a temperature of about 23 Celsius and a pressure of 1 atmosphere. The maximum threshold value of relative humidity may be preferably comprised between 30 and 55 percent at a temperature of about 23 Celsius and a pressure of 1 atmosphere.

The water adsorbed in the adsorption portion may be comprised for example between 5-110 percent, expressed as ratio in relation to the weight of the Metal-organic framework or Metal-organic frameworks: Grams of water/Grams of Metal-organic framework or Metal-organic frameworks.

The water adsorbed in the adsorption portion may be comprised for example between 5-220 percent, expressed as ratio in relation to the weight of the carbonate or carbonates: Grams of water/Grams of carbonate or carbonates.

The Metal-organic frameworks are compounds very efficient in adsorbing water. The provision of the binder allows the adsorption action to be improved. The binder allows the efficiency of the adsorption to be increased.

The at least one Metal-organic framework may be Aluminium Fumarate ($C_{12}H_6Al_2O_{12}$).

The at least one Metal-organic framework may be chosen in the group of the chromium terephthalate Metal-organic frameworks MIL-101(Cr), comprising trimeric chromium (III) octahedral clusters interconnected by 1,4-benzenedicarboxylates and having empirical formula $[Cr_3(O)X(bdc)_3(H_2O)_2]$, wherein bdc is benzene-1,4-dicarboxylate and X is OH or F. In an embodiment the Metal-organic frameworks MIL-101(Cr), has the general formula $(Cr_3O(OH)(H_2O)_2(bdc)_3$.

The at least one Metal-organic framework may be chosen in the group of the functionalized chromium terephthalate Metal-organic frameworks, MIL-101(Cr)—X, where X denotes an electron withdrawing ($NO_2$, $SO_3H$ or Cl) or electron donor ($NH_2$ or $CH_3$) group.

The at least one Metal-organic framework may be chosen in the group of the amino-functionalized chromium terephthalate Metal-organic frameworks, MIL-101(Cr)—$NO_2$.

The at least one Metal-organic framework may be chosen in the group of the group of the iron terephthalate Metal-organic frameworks, MIL-101(Fe).

The at least one Metal-organic framework may be chosen in the group of the chromium-based Metal-organic frameworks with underlying soc topology Cr-soc-Metal-organic framework-1 with chemical formula $[Cr_3(\mu3-O)(H_2O)2(TCPT)1.5Cl]$ where TCPT is tetratopic 3,3",5,5"-tetrakis(4-carboxyphenyl)-p-terphenyl ligand.

The at least one Metal-organic framework may be chosen in the group of the isostructural Zr(IV)-MOFs with rare low-symmetric 9-connected Zr6 clusters MOFs, indicated as Zr(IV)-MOFs BUT-46F, BUT-46A, BUT-46W, and BUT-46B), preferably Zr(IV)-MOFs BUT-46A.

The at least one Metal-organic framework may be chosen in the group of the hybrid microporous highly connected rare-earth-based Metal-organic frameworks Y-shp-MOF-5, where "shp" denotes square hexagonal prism.

The moisture regulating product may comprise a plurality of Metal-organic frameworks compounds chosen in any one of the groups indicated above.

The moisture regulating product may comprise Aluminium Fumarate and Mil-101 (Cr).

The moisture regulating product may comprise Aluminium Fumarate and Mil-101 (Fe). The moisture regulating product may comprise about 50 weight percent of Aluminium Fumarate and about 50 weight percent of Mil-101 (Fe), based on the total weight of the Metal-organic framework compounds.

It is to be understood that any other possible Metal-organic framework may be used in the moisture regulating product.

The at least one binder is a water-soluble carrier for improving the solubilisation of the at least one Metal-organic framework and/or of the at least one inorganic salt and/or of the at least one carbonate.

The binder improves the coupling of the moisture regulating product with the packaging material.

The binder allows the water to reach the at least one Metal-organic framework so as to enhance the adsorption of water from the at least one Metal-organic framework. The binder also avoids that the adsorption capacity of the at least one metal-organic framework is impaired.

The binder improves the adsorption of the at least one carbonate.

The at least one binder of the moisture regulating product may be potato starch.

It is to be understood that any other possible binders may be used in the moisture regulating product.

By choosing the proper binder and the proper combination Metal-organic framework or Metal-organic frameworks and/or inorganic salt or inorganic salts, and/or of the at least one carbonate, and binder or binders, it is possible to obtain a moisture regulating product that efficiently adsorbs water a predetermined relative humidity range.

The moisture regulating product may comprise Aluminium Fumarate and potato starch.

The moisture regulating product may comprise MIL-101 (Cr) and potato starch.

The moisture regulating product may comprise Potassium Carbonate and potato starch.

The moisture regulating product may comprise Potassium Carbonate and Carboxyl Methyl Cellulose.

The package may comprise the moisture regulating product in which the relative ratio between the weight of the at least one Metal-organic framework and the weight of the at least one binder is comprised between 1:4 and 3:2.

The package may comprise the moisture regulating product wherein the relative ratio between the weight of the at least one Metal-organic framework with the at least one inorganic salt or inorganic salts and the weight of the at least one binder is comprised between 1:4 and 3:2.

The package may comprise the moisture regulating product wherein the relative ratio between the weight of the at least one carbonate and the weight of the at least one binder is comprised between 1:4 and 3:2.

These ratios allow an efficient adsorption of the water and to efficiently keep the relative humidity in the package at the desired range.

The package may comprise an amount of the moisture regulating product comprised between 20-300 grams per square meter.

The package may comprise an amount of the at least one Metal-organic framework or Metal-organic frameworks comprised between about 0.30 and about 5.00 grams, preferably between about 0.50 and about 2.50 grams, more preferably between about 0.75 and about 1.50 grams, more preferably about 1.00 gram.

The package may comprise an amount of the at least one Metal-organic framework or Metal-organic frameworks with the at least one inorganic salt or inorganic salts comprised between about 0.30 and about 5.00 grams, preferably between about 0.50 and about 2.50 grams, more preferably between about 0.75 and about 1.50 grams, more preferably about 1.00 gram.

The package may comprise an amount of the at least one carbonate comprised between about 0.30 and about 5.00 grams, preferably between about 0.50 and about 2.50 grams, more preferably between about 0.75 and about 1.50 grams, more preferably about 1.00 gram.

These quantities of moisture regulating product in the package allow the relative humidity to be kept in a pre-defined range of relative humidity. These quantities of moisture regulating product allow to efficiently adsorb water in a package.

The package may comprise about 1.00 gram ($\pm20\%$) of Aluminium Fumarate.

The package may comprise about 1.00 gram ($\pm20\%$) of MIL-101 (Cr).

The package may comprise about 1.00 gram ($\pm20\%$) of MIL-101 (Fe).

The package may comprise about 0.50 grams ($\pm20\%$) of MIL-101 (Cr) and about 0.50 grams ($\pm20\%$) of Aluminium Fumarate.

The package may comprise about 1.00 gram ($\pm20\%$) of Potassium Carbonate and about 0.33 grams ($\pm20\%$) Carboxyl Methyl Cellulose.

The package may comprise about 0.50 grams ($\pm20\%$) of Potassium Carbonate and about 0.17 grams ($\pm20\%$) Carboxyl Methyl Cellulose.

The package may comprise about 2.00 grams ($\pm20\%$) of Potassium Carbonate and about 0.67 grams ($\pm20\%$) Carboxyl Methyl Cellulose.

The package may comprise moisture regulating product comprising about 75 weight percent ($\pm20\%$) on total dry weight basis of the at least one carbonate salt and about 25 weight percent ($\pm20\%$) on total dry weight basis of at least one binder.

The package may comprise about 0.50 grams ($\pm20\%$) of Potassium Carbonate and about 0.50 grams ($\pm20\%$) of a Metal-organic framework, preferably MIL-101 (Cr) and/or Aluminium Fumarate.

The package may be a package containing Heat not burn tobacco product.

The package may be a HEETS package.

The package may comprise a plurality of packaging materials provided with the moisture regulating product.

The package may comprise at least one packaging element made of a packaging material comprising the moisture regulating product.

The package may comprise a plurality of packaging elements made of a packaging material comprising the moisture regulating product.

The package may comprise at least one packaging element made of or containing the packaging material comprising the moisture regulating product.

The least one packaging element may be a hinge lid and/or an inner frame and/or an inner liner, or a pad or a porous pouch inserted in the package.

Additionally, a packaging material comprising the moisture regulating product may be added to a package, for example inserted into the package.

The packaging material may be chosen in a group comprising fiber-based material or plastics material, preferably chosen in a group comprising paper, paperboard, textiles, fabrics, non-woven materials, polymers, polymer foams and polymer films.

The type of packaging material may be chosen in dependence of the package to be obtained.

It is to be understood that other types of packaging materials comprising the moisture regulating product may be used.

The packaging material may be a foamed packaging material, preferably based on one or more biopolymers and having preferably a density comprised between 10-900 kilograms per cubic meter.

The foamed packaging material may further comprise stabilizers or plasticisers.

The packaging material provided with the moisture regulating product may be integrated in a plurality of different packaging elements of the package.

The packaging material allows to obtain packages maintaining the relative humidity in the package and the moisture content of the tobacco or nicotine containing product packaged in the packages at a predefined range.

The packaging material provided with the moisture regulating product may be used for wrapping the tobacco or nicotine containing product inside a package maintaining the moisture content of the tobacco or nicotine containing product within at a predefined range.

The packaging material may form a part of a package, or may be added into a package.

The packaging material of the invention may be used for obtaining different types of packages of different tobacco or nicotine containing products.

The packaging material may comprise a fiber-based material.

The packaging material may comprise plastics material.

The packaging material may be a paper with a grammage range between about 20 to about 200 grams per square meter.

The packaging material may be a paperboard with grammage between about 180 to about 300 grams per square meter.

The packaging material may comprise an amount of moisture regulating product comprised between about 20 to 300 grams per square meter.

The packaging material may comprise an amount of the moisture regulating product comprised between about 20 to 300 grams per square meter.

The packaging material may comprise an amount of the at least one Metal-organic framework and/or of at least one inorganic salt comprised between about 20 to 300 grams per square meter.

The packaging material may comprise an amount of the at least one carbonate comprised between about 20 to 300 grams per square meter.

The packaging material may be a foamed packaging material. The foamed packaging material may be prepared from biopolymers, like for example starch, protein, cellulose.

In order to prepare the foamed support material, the moisture regulating composition and additionally at least one modifier are provided to be added to the support material. For example, wood pulp fibres, starch plasticisers like for example glycerol, water may be added to the support material as modifiers.

Then the steam foaming is carried out for causing the formation of a foamed packaging material.

Thereafter a hot press moulding or a steam-based extrusion is performed to obtain the foamed material in the desired form.

A foamed packaging material is obtained having a density in the range between about 10000- to about 900000 grams per cubic meter.

The packaging material may comprise a pad, or an insert or a porous pouch to be inserted in the package and provided with the moisture regulating product.

The packaging material may be impregnated with the moisture regulating product. A wet impregnation, or a dry impregnation process may be used.

For applying the moisture regulating product to a packaging material a dry impregnation process based on the use of an alternating electric field to charge the powder particles of at least one metal-organic framework allows to deposit the at least one metal-organic framework on all kind of porous packaging material, including nonwoven materials, fabrics, papers and foams.

The dry impregnation method allows a moisture regulating product in powder form to be impregnated in the packaging material.

The dry impregnation may be executed for example by means of high intensity alternating electric fields. Any other dry impregnation method known in the field and suitable for the packaging material in use may be used.

It is possible to obtain a packaging material and thus a package that adsorbs humidity within a preferred range.

The moisture regulating product may also be impregnated into the packaging material by means of the impregnation method of the invention.

The impregnating bath may comprise a moisture regulating product according to the invention and water as dissolving substance.

By immersing the packaging material in the impregnating bath the packaging material is impregnated with the solution of the impregnating bath. With the composition of the impregnating bath, after drying the packaging material, it is possible to obtain a support material having between about 30 grams per square meter and about 300 grams per square meter of the at least one Metal-organic framework and/or of the at least one inorganic salt preferably combined with the at least one binder.

After immersing the packaging material in the impregnating bath, the packaging material impregnated with the moisture regulating solution of the impregnating bath may be fed to metering rolls to remove excess solution from the packaging material and then drying the packaging material.

A different wet impregnation method known in the field and suitable for the packaging material in use may be used.

Impregnating the moisture regulating product into the packaging material allows to distribute the moisture regulating product throughout the thickness of the packaging material.

The packaging material may comprise a coating layer containing the moisture regulating product.

The packaging material may comprise a plurality of coating layers containing the moisture regulating product.

The coating layer may be formed by the moisture regulating product.

The packaging material may comprise at least one layer of moisture regulating product having a thickness comprised between about 10 micrometres and about 80 micrometres, preferably between about 15 micrometres and 70 micrometres, more preferably between about 20 micrometres and about 60 micrometres.

The packaging material may be coated with the moisture regulating product forming a coating layer on the packaging material. The coating layer may be formed with any method and apparatus known in the art for example any method of surface coating.

In this way one surface of the packaging material adsorbs water in a very efficient way.

The packaging material may be provided with two different coating layers containing the moisture regulating product provided on opposite side of the packaging material so that the packaging material in interposed between the two coating layers.

The packaging material can be a web of material that it is continuously supplied to the impregnating bath.

The packaging material can be a sheet of material that it is supplied to the impregnating bath.

The preparation of the packaging material containing the moisture regulating product may be performed also with other methods known in the art.

The packaging material comprising the moisture regulating product may be obtained by any available technology known in the art.

The product can be a "heat-not-burn" product, or a cigarette, or any type of tobacco containing product.

Adsorption indicates here the adhesion of atoms, ions or molecules from a gas, liquid or dissolved solid to a surface. This process creates a film of the adsorbate on the surface of the adsorbent. Absorption denotes the process in which a fluid (the absorbate) is dissolved by or permeates a liquid or solid (the absorbent), respectively. The term sorption encompasses both processes.

In this specification the term adsorption is used for indicating both "adsorption" and "absorption" process. Analogously the term "adsorbing" is used here for indicating both "adsorbing" and "absorbing" process.

In the present specification the definition "Adsorption isotherm" or "Sorption isotherm" denotes the "moisture sorption isotherm", i.e. the relationship between water content of a material and corresponding equilibrium relative humidity at equilibrium. For each relative humidity value, the adsorption isotherm indicates the corresponding water content value of a material at a given, constant temperature.

Relative humidity is the ratio of the partial pressure of water vapour to the equilibrium vapour pressure of water at a given temperature and it is usually expressed in percent. Relative humidity depends on the temperature and the pressure of the system. Here the relative humidity is measured at a temperature of about 23 Celsius and at the atmospheric pressure 1 atmosphere. The relative humidity (RH) of an air-water mixture is defined as the ratio of the partial pressure of water vapour ($p_{H2O}$) in the mixture to the equilibrium vapour pressure of water ($p^*_{H2O}$) over a flat surface of pure water at a given Temperature: $RH = p_{H2O}/p^*_{H2O}$.

In the present specification the definition "water content" or "moisture content" of a material is the quantity of water contained in the material. The moisture content is expressed as the ratio weight of water/weight of the material, which can range from 0 (completely dry) to the value of the materials' porosity at saturation. It can be given on a volumetric or mass (gravimetric) basis. In the present application it is indicated on mass basis of the dry product, void of water.

Metal-organic frameworks (MOFs) are a class of compounds consisting of metal ions or clusters coordinated to organic ligands to form one-, two-, or three-dimensional structures containing potential voids. Metal-organic frameworks (MOFs) are provided with pores having a dimension less than 2 nanometers, have a crystalline nature and are very stable. The Metal-organic frameworks are light and porous materials with outstanding surface area.

With the definition "Metal-organic framework without water" it is indicated the Metal-organic framework at dry condition, void of water.

With the definition "carbonate without water" it is indicated the carbonate at dry condition, void of water.

As indicated herein the definition "Carbonate" or "Carbonate salt" denotes a salt of carbonic acid ($H_2CO_3$) characterized by the presence of the carbonate ion, a polyatomic ion with the formula of $(CO_3)^{2-}$. Examples of carbonates includes calcium carbonate, $CaCO_3$, magnesium carbonate $CaMg(CO3)_2$, Sodium carbonate $Na_2CO_3$, potassium carbonate $K_2CO_3$.

"Binder" here denotes any compound which can be bound to the Metal-organic framework or Metal-organic frameworks and/or the carbonate or carbonates and to a possible package to material.

As used herein, the term "modifier" denotes any additive that can be added to the moisture regulating product or solution for improving the properties, for example the solubility of the at least one Metal-organic framework, the solubility of the binder, the chemical connection between Metal-organic framework and the binder, the adhesion to the packaging material, etc.

As used herein, the term "packaging material" denotes any material that can be used as a packaging element of a package, as a part of a package. It may further indicate an element inserted into a package.

"Fiber-based packaging material" denotes a material including fibres. The fiber-based packaging material may include any type of fibres, for example cellulose fibres.

As used here the definition "impregnating bath" denotes a bath containing a solution with a solvent and a compound dissolved in the bath and in which a packaging material may be immersed. The packaging material is impregnated with the solution of the impregnating bath and adsorbs the solution contained in the impregnating bath.

As used herein, the terms "sheet" denotes a laminar element having a width and length substantially greater than the thickness thereof.

As indicated herein the definition "web" denotes, a laminar element having a width and length substantially greater than the thickness thereof and the length substantially greater than the width, usually wrapped in reels.

Specific embodiments will be further described, by way of example only, with reference to the accompanying drawings in which.

Many compounds adsorb water at defined humidity, temperature and pressure conditions.

For each material or product at a set temperature value, at equilibrium condition, the relationship between water content of the product or material and equilibrium relative humidity of the product or a material can be displayed graphically by a curve, the so-called moisture sorption isotherm.

The moisture sorption isotherm indicates for each relative humidity value the corresponding water content value of a material at a given, constant temperature.

Changing the temperature also the path of the adsorption isotherm changes as the equilibrium conditions change in relation to the temperature. Usually, increasing the temperature the materials hold less water and, on the contrary, decreasing the temperature the material can hold more water.

If the material or product changes, then the adsorption behaviour also changes.

Adsorption isotherm provides the measure of water uptake of a material or product with respect to change in the relative humidity.

Figure 1:
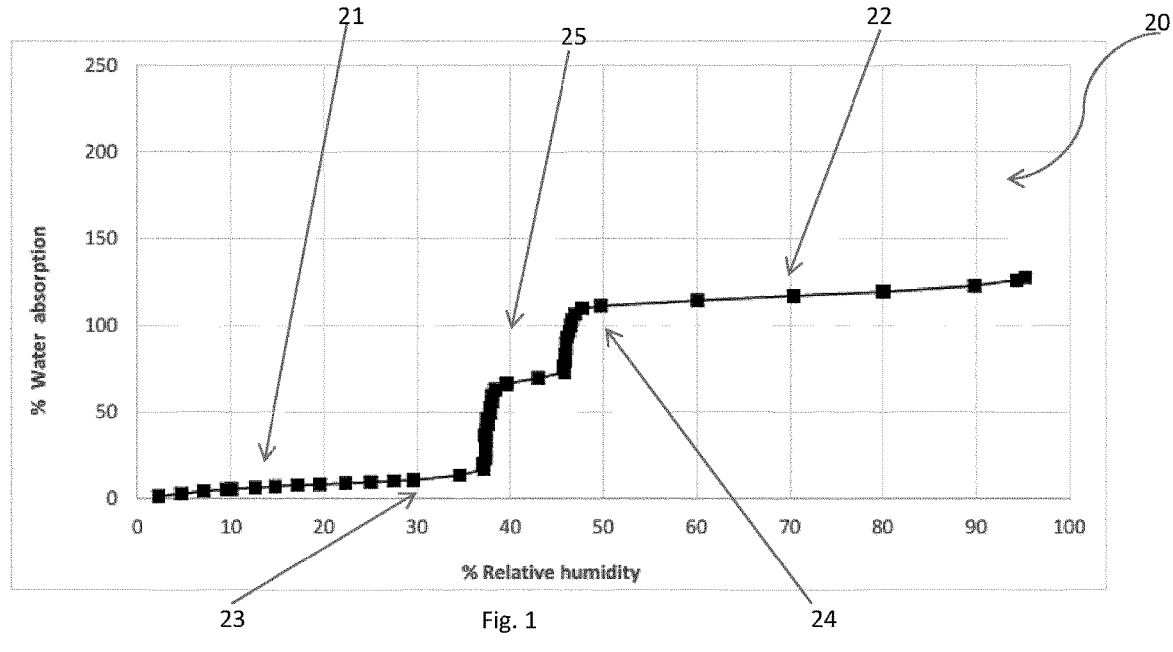
FIG. 1 shows a sorption isotherm of a sample of Aluminium Fumarate at 23 Celsius and at a pressure of 1 atmosphere.

In FIG. 1 it is reported the sorption isotherm of a sample of Aluminium Fumarate obtained at 23 Celsius and the pressure of 1 atmosphere using a sample of 70 milligrams of pure Aluminium Fumarate.

Figure 2:
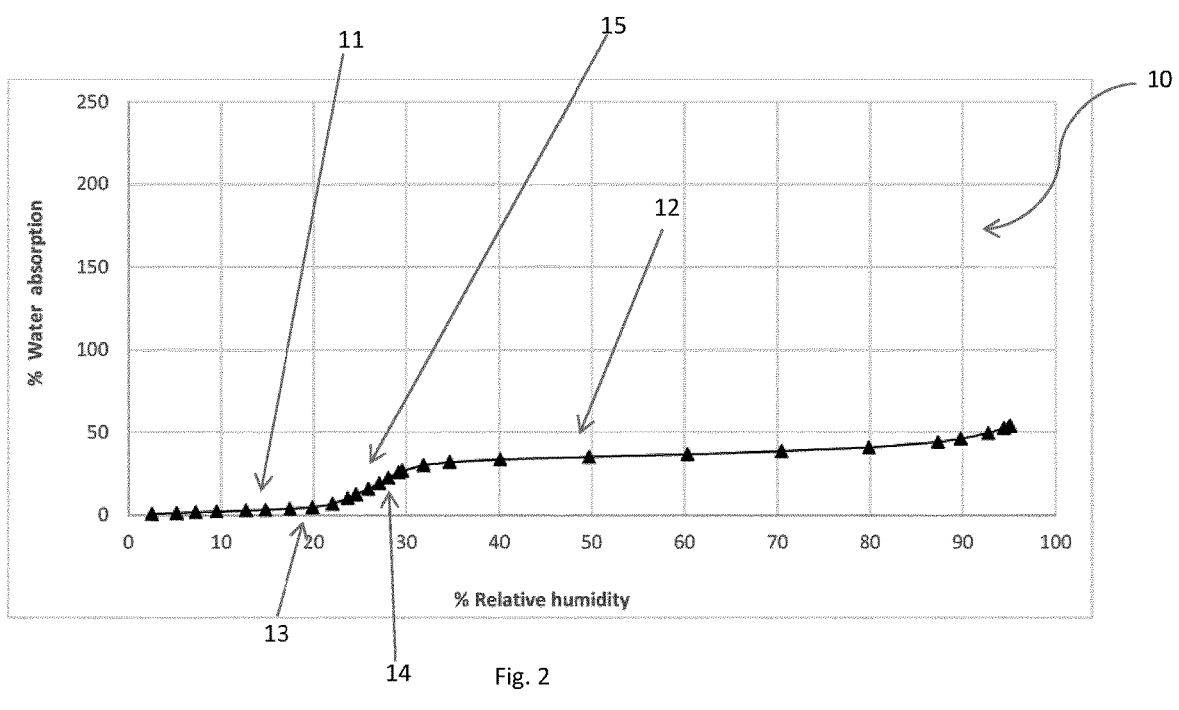
FIG. 2 shows a sorption isotherm of a sample of MIL-101 at 23 Celsius and at a pressure of 1 atmosphere.

In FIG. 2 it is reported the sorption isotherm of a sample of MIL-101 (Cr) obtained at 23 Celsius and the pressure of 1 atmosphere using a sample of 70 milligrams of pure MIL-101 (Cr).

Figures 3, 4:
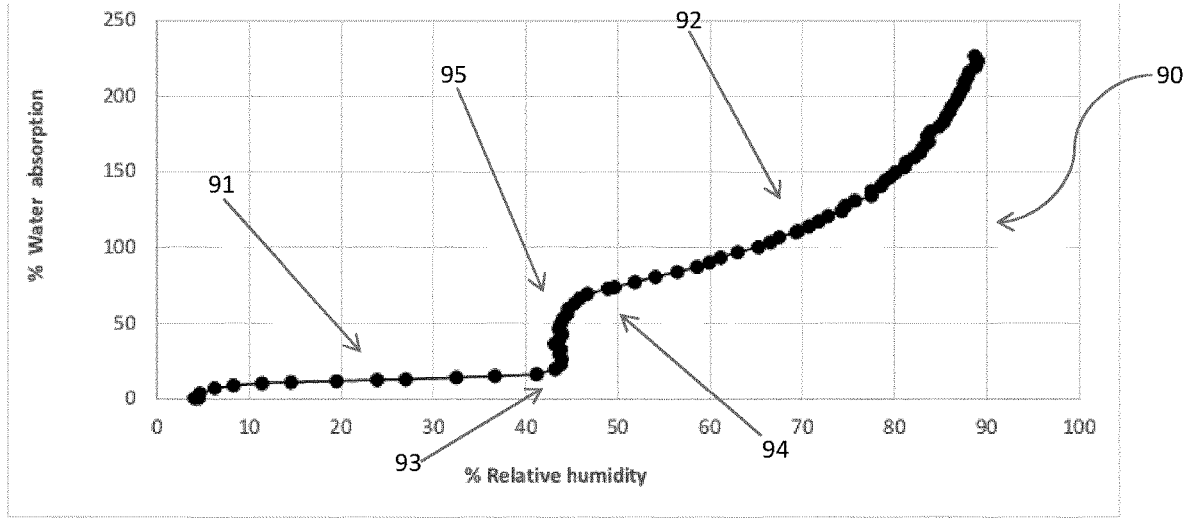
FIG. 3 shows a sorption isotherm of a sample of Potassium Carbonate and Carboxyl Methyl Cellulose (75 weight percent $K_2CO_3$/25 weight percent CMC) at 23 Celsius and at a pressure of 1 atmosphere.
FIG. 4 shows the percent relative humidity over time of some of the packages prepared in the Examples.

In FIG. 3 it is reported the sorption isotherm of a sample of 70 grams of Potassium Carbonate and 23.33 grams of Carboxyl Methyl Cellulose at 23 Celsius and the pressure of 1 atmosphere.

The Sorption isotherm has been obtained analysing the sample at 23 Celsius at 1 atmosphere in Belsorp aqua 3 machine, MicrotracBEL Corp. Japan.

Before the start of the analysis the samples have been activated.

Before analysis the Aluminium Fumarate was activated by placing the sample in a container of a Belprep II machine with vacuum, at a pressure of 0.01 kiloPascal, (Microtrac-BEL Corp. Japan) and purging few times with Argon.

Then the sample has been heated up to 200 Celsius in two hours and held at this temperature for 8 hours in order to reduce the water content of the sample to about 1 weight percent.

After cooling down, the container is filled with Argon and placed in Belsorp aqua 3 machine.

The relative humidity of the container is then changed over time and the water intake of the sample of Aluminium Fumarate is registered so as to obtain the sorption isotherm of FIG. 1. The measurement was done at laboratory temperature of 23 Celsius and at a pressure of 1 atmosphere.

The same has been repeated for the sample of pure MIL-101 (Cr) obtaining the adsorption isotherm of FIG. 2.

The sample of Potassium Carbonate and Carboxyl Methyl Cellulose has been activated at a temperature of 120 Celsius with the same method used for the Aluminium Fumarate. The relative humidity of the container is then changed over time and the water intake of the sample of Potassium Carbonate and Carboxyl Methyl cellulose is registered so as to obtain the sorption isotherm of FIG. 3. The measurement was done at laboratory temperature of 23 Celsius and at a pressure of 1 atmosphere.

The Aluminium Fumarate and the MIL-101(Cr) were purchased from NovoMOF, AG, Switzerland.

The Potassium Carbonate and Carboxyl Methyl Cellulose were purchased from Fischer Scientific, Switzerland.

In FIG. 1 it is reported in the abscissa (x-axis) the percent relative humidity, in the ordinate (y-axis) the percent of water adsorption for the sample of Aluminium Fumarate.

The water adsorption is indicated as weight percent i.e. the weight of the water adsorbed/the weight of the aluminium Fumarate.

The adsorption isotherm of Aluminium Fumarate has a sigmoidal path.

The adsorption isotherm 10 of Aluminium Fumarate comprises a first portion 11 comprised between zero relative humidity and a minimum threshold value of relative humidity 13 in which the Aluminium Fumarate adsorbs about 1-5 percent of water and the water adsorbed by the Aluminium Fumarate has a gradual increase in dependence of the relative humidity.

The sorption isotherm 10 of the Aluminium Fumarate comprises a second portion 12 comprised between the maximum threshold relative humidity 14 and about one hundred percent of relative humidity in which the Aluminium Fumarate adsorbs low quantities of water in relation to the increase in relative humidity. In the second portion the Aluminium Fumarate adsorbs from about 35 to about 54 percent of water. The water adsorbed has a gradual increase in dependence of the relative humidity.

The minimum threshold value of relative humidity 13 is about 20 percent; the maximum threshold value of relative humidity 14 is about 34 percent.

The sorption isotherm 10 comprises an adsorption portion 15 comprised between the minimum threshold value of relative humidity 13 and the maximum threshold value of relative humidity 14. In the adsorption portion 15 the Aluminium Fumarate adsorbs higher quantities of water in relation to quantity of water adsorbed in the first portion 11 or the second portion 12. In the adsorption portion 15 the water adsorbed has a high increase in dependence of the relative humidity.

Considering the slope of the sorption isotherm 10, the slope in the first portion and in the second portion is lower than the slope in the adsorption portion. In the adsorption portion 15 the increase in the water adsorbed following an increase of the relative humidity is considerably higher than the increase in the water adsorbed following an increase of the relative humidity in the first portion 11 or in the second portion 12

In the adsorption portion 15 the Aluminium Fumarate adsorbs from about 5 to about 35 percent of water.

In FIG. 2 it is reported the sorption isotherm for MIL-101 (Cr), reporting in the abscissa (x-axis) the percent relative humidity, in the ordinate (y-axis) the percent of water adsorption. The water adsorption is indicated as weight percent i.e. the weight of the water adsorbed/the weight of the aluminium Fumarate or MIL-101 (Cr). The sorption isotherm of MIL-101 (Cr) has a sigmoidal path.

The sorption isotherm 20 of MIL-101 (Cr) comprises a first portion 21 comprised between zero relative humidity and a minimum threshold value of relative humidity 23 in which the MIL-101 (Cr) adsorbs about 1-5 percent of water and the water adsorbed by the MIL-101 (Cr) has a gradual increase in dependence of the relative humidity.

The sorption isotherm 20 of the MIL-101 (Cr) comprises a second portion 22 comprised between the maximum threshold relative humidity 24 and about one hundred percent of relative humidity in which the MIL-101 (Cr) adsorbs from about 110 to about 127 percent water and the water adsorbed has a gradual increase in dependence of the relative humidity.

The minimum threshold value of relative humidity 23 is about 37 percent; the maximum threshold value of relative humidity 24 is about 48 percent.

The sorption isotherm 20 comprises an adsorption portion 25 comprised between the minimum threshold value of relative humidity 23 and the maximum threshold value of relative humidity 24. In the adsorption portion 25 the MIL-101 (Cr) adsorbs higher quantities of water in relation to quantity of water adsorbed in the first portion 21 or the second portion 22. In the adsorption portion 25 the water adsorbed has a high increase in dependence of the relative humidity.

In the adsorption portion 25 the MIL-101 (Cr) adsorbs from about 5 to about 110 percent of water.

In FIG. 3 it is reported in the abscissa (x-axis) the percent relative humidity, in the ordinate (y-axis) the percent of water adsorption. The water adsorption is indicated as weight percent i.e. the weight of the water adsorbed/the weight of the sample of Potassium Carbonate and Carboxyl Methyl Cellulose.

The adsorption isotherm of Potassium Carbonate and Carboxyl Methyl Cellulose has a sigmoidal path as clearly visible from FIG. 3.

With specific reference to FIG. 3, the adsorption isotherm 90 of Potassium Carbonate and Carboxyl Methyl Cellulose comprises a first portion 91 comprised between zero relative humidity and a minimum threshold value of relative humidity 93 in which the Potassium Carbonate and Carboxyl Methyl Cellulose adsorbs about 1-20 percent of water and the water adsorbed by the Potassium Carbonate and Carboxyl Methyl Cellulose has a gradual increase in dependence of the relative humidity.

The sorption isotherm 90 of the Potassium Carbonate and Carboxyl Methyl Cellulose comprises a second portion 92 comprised between the maximum threshold relative humidity 94 and about 90 percent of relative humidity in which the Potassium Carbonate and Carboxyl Methyl Cellulose adsorbs high quantities of water in relation to the increase in relative humidity. In the second portion the Potassium Carbonate and Carboxyl Methyl Cellulose adsorbs from about 70 to about 225 percent of water. The water adsorbed has a gradual increase in dependence of the relative humidity.

The minimum threshold value of relative humidity 93 is about 44 percent; the maximum threshold value of relative humidity 94 is about 47 percent.

The sorption isotherm 90 comprises an adsorption portion 95 comprised between the minimum threshold value of relative humidity 93 and the maximum threshold value of relative humidity 94. In the adsorption portion 95 the Potassium Carbonate and Carboxyl Methyl Cellulose adsorbs higher quantities of water in relation to quantity of water adsorbed in the first portion 91 or the second portion 92. In the adsorption portion 95 the water adsorbed has a high increase in dependence of the relative humidity.

In the adsorbing portion 95 the Potassium Carbonate and Carboxyl Methyl Cellulose, between 44 and 47 percent of relative humidity, adsorbs from about 20 to about 70 percent of water.

Considering the slope of the sorption isotherm 90, the slope in the first portion and in the second portion is lower than the slope in the adsorption portion. In the adsorption portion 95 the increase in the water adsorbed at an increase of the relative humidity is considerably higher that the increase in the water adsorbed at an increase of the relative humidity in the first portion 91 or in the second portion 92.

Aluminium Fumarate, MIL-101 (Cr) and Potassium Carbonate with Carboxyl Methyl Cellulose show that in the adsorption portion 15, 25, 95 increasing the relative humidity there is an increasing adsorption of water.

The adsorption portion of Aluminium Fumarate, MIL-101 (Cr) and of Potassium Carbonate with Carboxyl Methyl Cellulose is comprised between different minimum and maximum threshold values of relative humidity, these minimum and maximum threshold values depending on the specific material.

The water adsorbed by Aluminium Fumarate, MIL-101 (Cr) and Potassium Carbonate with Carboxyl Methyl Cellulose in the adsorption portion is different as it depends on the specific material.

Therefore, by adjusting the moisture regulating product the range of relative humidity defining the adsorption portion may be adjusted.

Some moisture regulating products according to the invention have been prepared.

The prepared moisture regulating products have been then coupled with a packaging material. At least a portion of the packaging material containing the moisture regulating product is then inserted in a package for heat not burn products.

The relative humidity over time in the packages and the moisture content of the products packed in the packages have then been measured.

For the test HEETS packages have been used, provided by Philip Morris International. A HEETS package contains 20 tobacco sticks as Heat-Not-Burn products (HEETS). HEETS, also known as HeatSticks, is a specially designed heated tobacco unit that is intended for exclusive use with the IQOS holder (by Philip Morris International). HEETS are made up of elements that include a tobacco plug, hollow acetate tube, polymer-film filter, cellulose-acetate mouthpiece filter, and outer and mouth-end papers. With the HEETS the tobacco is heated, not burned. Instead of smoke coming from tobacco combustion, an aerosol is released to the user.

A top part of outer polypropylene film and the inner bundle paper has been removed from the HEETs package to resemble the opening of the HEET package from a user intending to use the sticks contained in the package. Additionally, 10 sticks out of 20 sticks have been removed from the HEET package.

The HEETS packages may contain tobacco sticks having different features or flavours.

For clarity sake different HEETS packages void of moisture regulating product have been compared with the corresponding HEETS packages containing a moisture regulating product or at least one Metal-organic framework or containing Potassium Carbonate and Carboxyl Methyl Cellulose. In this way, a clear effect of the moisture regulating product or of the at least one Metal-organic frameworks or of the Potassium Carbonate and Carboxyl Methyl Cellulose on the HEETS packages is obtained.

The relative humidity of the packages prepared has been measured and also the moisture content of the sticks in the packages has been measured.

A Plug and track Hygro button with datalogger (PROGESPLUS, France) was also placed inside the HEETS packages for measuring the relative humidity inside the packages. The packages were finally sealed in an aluminium bag.

Before placing the Hygro button Relative humidity analyzer in the packs, the buttons were configured with PROGESPLUS software to measure the Relative humidity inside the package before and during the duration of the test.

The Hygro button that has built-in datalogger measured the Relative humidity every 5 minutes and the graph showing the relative humidity with respect to time is extracted from the PROGESPLUS software.

The water content of the tobacco plug of each stick was determined using Karl Fisher method (similar to ASTM E203-16) with an analyzer Titrando 901 (Metrohm AG, Switzerland) and an analytical balance XP205 (Mettler Toledo, Switzerland). The water contained in the tobacco plug of each stick is extracted using an oven, by heating the stick at 110 Celsius.

The extracted vapour is transferred to a titration cell with an air flow through a heated transfer line and water content is quantitatively determined by titration.

Methanol is used to improve accuracy of the analysis.

The endpoint is measured by potentiometry and the result is given in weight percent. In the experimental test the quantity of Metal-organic framework, Potassium Carbonate, or binder is indicated in grams with two significant digits after comma, the values of the quantity of the Metal-organic frameworks Potassium Carbonate, or binder are rounded to two significant digits.

EXPERIMENTAL TEST

Example 1, 5, 12, 15

HEETS packages containing 20 tobacco sticks for Heat-Not-Burn have been provided.

10 sticks out of 20 sticks have been removed from the HEET package. A Plug and track Hygro button with data-logger (PROGESPLUS, France) was placed inside the HEETS packages for measuring the relative humidity inside the packages. The packages were finally sealed each in an aluminium bag. Before placing the Hygro button Relative humidity analyzer in the packages, the buttons were configured with PROGESPLUS software to measure the Relative humidity inside the package before and during the duration of the test. The Hygro button that has built-in datalogger measured the Relative humidity every 5 minutes and the graph showing the relative humidity with respect to time is extracted from the PROGESPLUS software.

The water content of the tobacco plug of each stick was determined using Karl Fisher method (similar to ASTM E203-16) with an analyzer Titrando 901 (Metrohm AG, Switzerland) and an analytical balance XP205 (Mettler Toledo, Switzerland). The moisture content of the tobacco plug of each stick is extracted using an oven, by heating the stick at 110 Celsius.

Example 2

A moisture regulating solution containing 1.00 grams of starch, 4.70 grams of water, 0.25 grams of Glycerol and 0.50 grams of Aluminium Fumarate has been prepared.

The Aluminium Fumarate was purchased from Novo-MOF, AG, Switzerland.

Glycerol ($HOCH_2CH(OH)CH_2OH$) was purchased from Sigma Aldrich, Switzerland.

Potato starch (($C_6H_{10}O_5)_n$) was purchased from PanReac AppliChem.

0.5 grams of Aluminium Fumarate were sieved and mixed with soluble potato Starch. The homogeneously mixed particles were then dissolved in distilled water in which Glycerol has been previously added.

The obtained solution was heated in a water bath up to 85 Celsius and held at this temperature for 45 minutes under magnetic stirring. Afterwards, the solution was cooled down to a temperature of about 20-30 Celsius.

The moisture regulating solution is then coated on a fiber-based packaging material.

The fiber-based packaging material used in Example 2 is a low density foam-formed paper having a density of 400 kilograms per cubic meter and a grammage of 120 gram per square meter purchased from VTT-Technical Research Centre, Finland.

The fiber-based packaging material was coated with an EZ coater EC 200 from Chemical Instruments Inc. Rod number 8, leading to a 20 micrometers thick layer using a velocity 0.00635 meters per second.

The obtained solution was heated in a water bath up to 85 Celsius and held at this temperature for 45 minutes under magnetic stirring. Then the solution is coated on the packaging material. A first layer was done 30 minutes after the solution was removed from heating source. After the solvent evaporates, a second layer coating is applied and then, after the solvent is evaporated from the second layer, a third layer coating is applied. In this way a layer of about 60 micrometers is obtained. The coating is made on both the surfaces of the packaging material.

The coated packaging material is then dried at room temperature at environment relative humidity. Then the coated packaging material is placed for 3 hours at 80 Celsius in an oven from Froilabo, in order to dry further the packaging material. The moisture content of the packaging material after the drying step should be below the moisture content corresponding to the minimum threshold value of the relative humidity of the Aluminium Fumarate in the sorption isotherm at the environmental condition (23 Celsius, 1 atmosphere).

Once dry, the fiber based support material was cut in smaller sheet of 4 centimetre×6.5 centimetre.

Then each sheet is sealed in aluminium bag until further analysis.

For analysing the relative humidity, two sheets have been placed in a HEETS package after removal of the top part of outer polypropylene film and the inner bundle paper and of 10 sticks from the package.

In this way a content of about 0.20 grams of Metal-organic framework or Metal-organic frameworks per each package of HEETS is obtained. This is indicated as Example 2 in the following.

A Plug and track Hygro button with datalogger (PROGESPLUS, France) was also placed in the packages for measuring the relative humidity inside the packages. The packages were finally sealed in an aluminium bag.

Example 3

A solution according the Example 2 has been prepared.

The solution has been then impregnated on a packaging material.

A paperboard having a density of 240 grams per square meter purchased by Invercote Lenato from Iggesund, Sweden has been used.

The paperboard was cut into 4 centimetre×6.5 centimetre sheets. The sheets were immersed in the moisture regulating solution obtained and kept for 30 minutes, so that the sheets of paperboard are impregnated with the moisture regulating solution.

The obtained sheets comprise about 0.155 grams of Aluminium Fumarate.

Then the sheets of paperboard have been placed in the oven to dry for 3 hours at 80 Celsius. The moisture content of the sheets of paperboard after the drying step should be below the moisture content corresponding to the minimum threshold value of the relative humidity of the Aluminium Fumarate in the sorption isotherm at the environmental condition (23 Celsius, 1 atmosphere). The dried impregnated sheets were stored in an aluminium bag until further analysis.

For analysing the relative humidity, two impregnated sheets have been placed in a HEETS package after removal of the top part of outer polypropylene film and the inner bundle paper and of 10 sticks from the package, so that in each HEETS package a content of about 0.31 grams of Aluminium Fumarate is obtained. This is indicated as Example 3 in the following.

A Plug and track Hygro button with datalogger (PRO-GESPLUS, France) was also placed inside the HEETS packages for measuring the relative humidity inside the packages. The packages were finally sealed in an aluminium bag.

Example 13

A solution containing 1.00 grams of Carboxyl Methyl Cellulose, 3.00 grams of Potassium Carbonate and 8.00 grams of water has been prepared.

The Potassium Carbonate was purchased from Fischer Scientific, Switzerland.

The Carboxyl Methyl Cellulose was purchased from—Fischer Scientific, Switzerland.

The obtained solution was heated in a water bath up to 85 Celsius and held at this temperature for 45 minutes under magnetic stirring. Afterwards, the solution was cooled down to a temperature of about 20-30 Celsius.

The solution is then coated on a fiber based packaging material. The fiber based packaging material used is the same as in Example 2: a low density foam-formed paper having a density of 400 kilograms per cubic meter and a grammage of 120 gram per square meter purchased from VTT-Technical Research Centre, Finland.

The fiber based packaging material was coated with an EZ coater EC 200 from Chemical Instruments Inc. Rod number 8, leading to a 20 micrometers thick layer using a velocity 0.00635 meters per second.

The solution obtained was heated in a water bath up to 85 Celsius and held at this temperature for 45 minutes under magnetic stirring. Then the solution is coated on the packaging material. A first layer was done 30 minutes after the solution was removed from heating source. After the solvent evaporates, a second layer coating is applied and then, after the solvent is evaporated from the second layer, a third layer coating is applied. In this way a layer of about 60 micrometers is obtained. The coating is made on both the surfaces of the packaging material. The second layer is applied when the first one is dry, usually after about 30 minutes from the first application. The third layer is applied when the second one is dry, usually after about 30 minutes from the application of the second layer.

The coated packaging material is dried at room temperature at environment relative humidity. Then the coated packaging material is placed for 3 hours at 80 Celsius in an oven from Froilabo, in order to dry the packaging material.

The moisture content of the coated packaging material after the drying step should be below the moisture content corresponding to the minimum threshold value of the relative humidity of the Potassium Carbonate and Carboxyl Methyl Cellulose in the corresponding sorption isotherm at the environmental condition (23 Celsius, 1 atmosphere).

Once dry, the fiber-based packaging material was cut in smaller sheets of 4 centimetre×6.5 centimetre. Then each sheet is sealed in an aluminium bag until further analysis.

For analysing the relative humidity, two sheets have been placed in a HEETS package after removal of the top part of outer polypropylene film and the inner bundle paper and of 10 sticks from the package.

In this way, a content of about 0.50 grams of Potassium Carbonate and about 0.17 grams of Carboxyl Methyl Cellulose per each package of HEETS is obtained. This is indicated as Example 13 in the followings.

A Plug and track Hygro button with datalogger (PRO-GESPLUS, France) was also placed inside the packages for measuring the relative humidity inside the packages. The packages were finally sealed in an aluminium bag.

Example 14

A moisture regulating solution has been prepared as according the Example 13.

The moisture regulating solution is then impregnated on a fiber-based packaging material.

The used fiber-based packaging material is the same as in Example 3.

A paperboard having a density of 240 grams per square meter purchased by Invercote Lenato from Iggesund, Sweden has been used.

The paperboard was cut into 4 centimetre×6.5 centimetre sheets. The sheets were immersed in the moisture regulating solution and kept for 30 minutes, so that the sheets of paperboard are impregnated with the moisture regulating solution of Example 13.

Sheets comprising about 0.50 grams of Potassium Carbonate and about 0.17 grams of Carboxyl Methyl Cellulose were obtained.

Then the sheets of paperboard have been placed in the oven to dry for 3 hours at 80 Celsius. The moisture content of the coated packaging material after the drying step should be below the moisture content corresponding to the minimum threshold value of the relative humidity of the Potassium Carbonate and Carboxyl Methyl Cellulose in the corresponding sorption isotherm at the environmental condition (23 Celsius, 1 atmosphere). The dried impregnated sheets were stored in an aluminium bag until further analysis.

For analysing the relative humidity, two sheets have been placed in a HEETS package after removal of the top part of outer polypropylene film and the inner bundle paper and of 10 sticks from the package.

Therefore about 1.00 gram of Potassium Carbonate and about 0.33 grams of Carboxyl Methyl Cellulose are inserted in each HEETS package.

A Plug and track Hygro button with datalogger (PRO-GESPLUS, France) was also placed inside the HEETS packages for measuring the relative humidity inside the packs. The packages were finally sealed in an aluminium bag.

This is indicated as Example 14 in the following.

Example 21

A solution has been prepared according to Example 14 and impregnated on the same type of support material used in Example 14.

A paperboard having a density of 240 grams per square meter purchased by Invercote Lenato from Iggesund, Sweden has been used.

The paperboard was cut into 4 centimetre×6.5 centimetre sheets. The sheets were immersed in the moisture regulating solution and kept for 30 minutes, so that the sheets of paperboard are impregnated with the moisture regulating solution of Example 14.

Sheets are obtained comprising about 1.33 grams of Potassium Carbonate and Carboxyl methyl Cellulose. The sheets comprise about 1.00 gram of Potassium Carbonate and 0.33 grams of Carboxyl Methyl Cellulose.

Then the sheets of paperboard have been placed in the oven to dry for 3 hours at 80 Celsius. The dried impregnated sheets were stored in an aluminium bag until further analysis. After the drying step, the moisture content of the packaging material should be below the moisture content corresponding to the minimum threshold value of the relative humidity of the Potassium Carbonate and Carboxyl Methyl Cellulose in the corresponding sorption isotherm at the environmental condition (23 Celsius, 1 atmosphere).

For analysing the relative humidity, two sheets have been placed in a HEETS package after removal of the top part of outer polypropylene film and the inner bundle paper and of 10 sticks from the package.

Therefore 2.67 grams of Potassium Carbonate and Carboxyl methyl Cellulose are inserted in each HEETS package. The sheets comprise about 2.00 grams of Potassium Carbonate and 0.67 grams of Carboxyl methyl Cellulose.

A Plug and track Hygro button with datalogger (PROGESPLUS, France) was also placed inside the HEETS packages for measuring the relative humidity inside the packs. The packages were finally sealed in an aluminium bag.

This is indicated as Example 21 in the followings.

FURTHER EXAMPLES

For comparison sake some Metal-organic framework solutions void of binder were prepared. The Metal-organic framework solutions were adsorbed or inserted on a porous pouch.

Porous pouches containing 1.00 gram of Aluminium Fumarate were prepared and positioned in two HEETS package. These samples are indicated respectively as Example 4 and 16 in the following.

Porous pouches containing respectively 0.20 grams, 0.50 grams and 1.00 gram of MIL-101 Fe were prepared. These samples are indicated respectively as Example 9-11 in the following.

Porous pouches containing respectively 0.20 grams, 0.50 grams and 1.00 gram of MIL-101 Cr were prepared. These samples are indicated respectively as Example 6-8 in the following. A further pouch with 1.00 gram of MIL-101 Cr has been prepared (Example 17) and positioned in another HEETS package.

Metal-organic frameworks porous pouches containing a plurality of Metal-organic frameworks were also prepared.

A porous pouch containing 0.50 grams Aluminium Fumarate and 0.50 grams MIL-101 Fe was also prepared. This sample is indicated as Example 18 in the following.

A porous pouch containing 0.50 grams Aluminium Fumarate and 0.50 grams MIL-101 Cr was also prepared. This sample is indicated as Example 19 in the following.

A porous pouch containing 1.00 gram of Potassium Carbonate and Carboxyl Methyl Cellulose was also prepared. This sample is indicated as Example 20 in the following.

For analysing the relative humidity, each porous pouch has been placed in a HEETS package after removal of the top part of outer polypropylene film and the inner bundle paper and of 10 sticks from the package.

The HEETS package contains 20 tobacco sticks for Heat-Not-Burn products. Each stick contains a tobacco plug containing the crimped cast leaf material.

A Plug and track Hygro button with datalogger (PROGESPLUS, France) was also placed inside the packages for measuring the relative humidity inside the packages. The packages were finally sealed in an aluminium bag which remained closed for few days. The packages are kept in an aluminium bag until the Relative Humidity inside the package is stabilised. Usually some hours are sufficient.

In Table 1 reported below the packages analysed are summarised indicating the Example number and the way of adsorption for clarity sake.

The relative humidity has been measured in the different HEETS packages:

in HEETS packages containing a moisture regulating product, Examples 2 and 3;

in HEETS packages containing one or more Metal-organic frameworks, Examples 4, 6-11 and 16-19;

in HEETS packages void of any moisture regulating product, Example 1, 5, 12 and 15.

TABLE 1

| SAMPLE | PREPARATION | INTEGRATION METHOD |
|---|---|---|
| Example 1 | Reference 1 | n/a |
| Example 2 | Aluminium Fumarate 0.20 g/ Starch/Glycerol | Coating |
| Example 3 | Aluminium Fumarate 0.30 g/ Starch/Glycerol | Impregnation |
| Example 4 | Aluminium Fumarate 1.00 g | Porous pouch |
| Example 5 | Reference 2 | n/a |
| Example 6 | MIL-101 (Cr) 0.20 g | Coating |
| Example 7 | MIL-101 (Cr) 0.50 g | Impregnation |
| Example 8 | MIL-101 (Cr) 1.00 g | Porous pouch |
| Example 9 | MIL-101 (Fe) 0.20 g | Coating |
| Example 10 | MIL-101 (Fe) 0.50 g | Impregnation |
| Example 11 | MIL-101 (Fe) 1.00 g | Porous pouch |
| Example 12 | Reference 3 | n/a |
| Example 13 | Potassium carbonate 0.50 g/ Carboxyl Methyl Cellulose 0.17 g | Coating |
| Example 14 | Potassium carbonate 1.00 g/ Carboxyl Methyl Cellulose 0.33 g | impregnation |
| Example 15 | Reference 4 | n/a |
| Example 16 | Aluminium Fumarate 1.00 g | Porous pouch |
| Example 17 | MIL-101 (Cr) 1.00 g | Porous pouch |
| Example 18 | Aluminium Fumarate 0.50 + MIL-101 (Fe) 0.50 g | Porous pouch |
| Example 19 | Aluminium Fumarate 0.50 + MIL-101 (Cr) 0.50 g | Porous pouch |
| Example 20 | Potassium carbonate 1.00 g/ Carboxyl Methyl Cellulose 0.33 g | Porous pouch |
| Example 21 | Potassium carbonate 2.00 g/ Carboxyl Methyl Cellulose 0.67 g | Impregnation |

Measurements

At a certain moment indicated at time TO, all packages prepared according to the Examples discussed above and indicated in Table 1 were opened and the aluminium bags were placed in a climatic chamber at 30 Celsius with a relative humidity of 75 percent.

Three sticks were removed from each package and the three sticks of each Example of Table 1 were sealed together in a further aluminium bag.

After 2, 4, 6, 8, 24 and 48 hours, one stick was removed from each package and sealed in an aluminium bag with the other sticks of the same Example and thus from the same package until the sticks in each package are finished.

All sticks were then analyzed by Karl Fischer method to measure the water content of the different sticks removed from the packages as explained below. During the entire experiment, the evolution of relative humidity in each package was recorded as explained below.

Relative Humidity Analysis

As indicated above, for measuring the relative humidity inside the packages a Plug and track Hygro button with datalogger (PROGESPLUS, France) was placed inside the packs. Before placing the Hygro button Relative humidity analyzer in the packages, the buttons were configured with PROGESPLUS software to measure the Relative humidity inside the package before and during the duration of the test. The Hygro button that has built-in datalogger measured the Relative humidity every 5 minutes and the graph showing the relative humidity with respect to time is extracted from the PROGESPLUS software.

The results obtained for the packages of the Examples 15, 20 and 21 are reported in FIG. 4 and discussed below.

The results obtained for the packages of the Examples 15-19 are reported in FIG. 5 and discussed below.

Water Content Analysis

The water content of the tobacco plug of each stick was determined using Karl Fisher method (similar to ASTM E203-16) with an analyzer Titrando 901 (Metrohm AG, Switzerland) and an analytical balance XP205 (Mettler Toledo, Switzerland). The water contained in the tobacco plug of each stick is extracted using an oven, by heating the stick e at 110 Celsius.

The extracted vapour is transferred to a titration cell with an air flow through a heated transfer line and water content is quantitatively determined by titration.

Methanol is used to improve accuracy of the analysis.

The endpoint is measured by potentiometry and the result is given in weight percent.

The percent water content of the each of the stick at each time interval is analysed to determine the adsorption capacity of the adsorbing material or materials used in the Examples.

The results obtained from the sticks of the Examples 15, 20 and 21 are reported in FIG. 7 and discussed below.

The results obtained from the sticks of the Examples 15-19 are reported in FIG. 6 and discussed below.

Results

Figure 5:
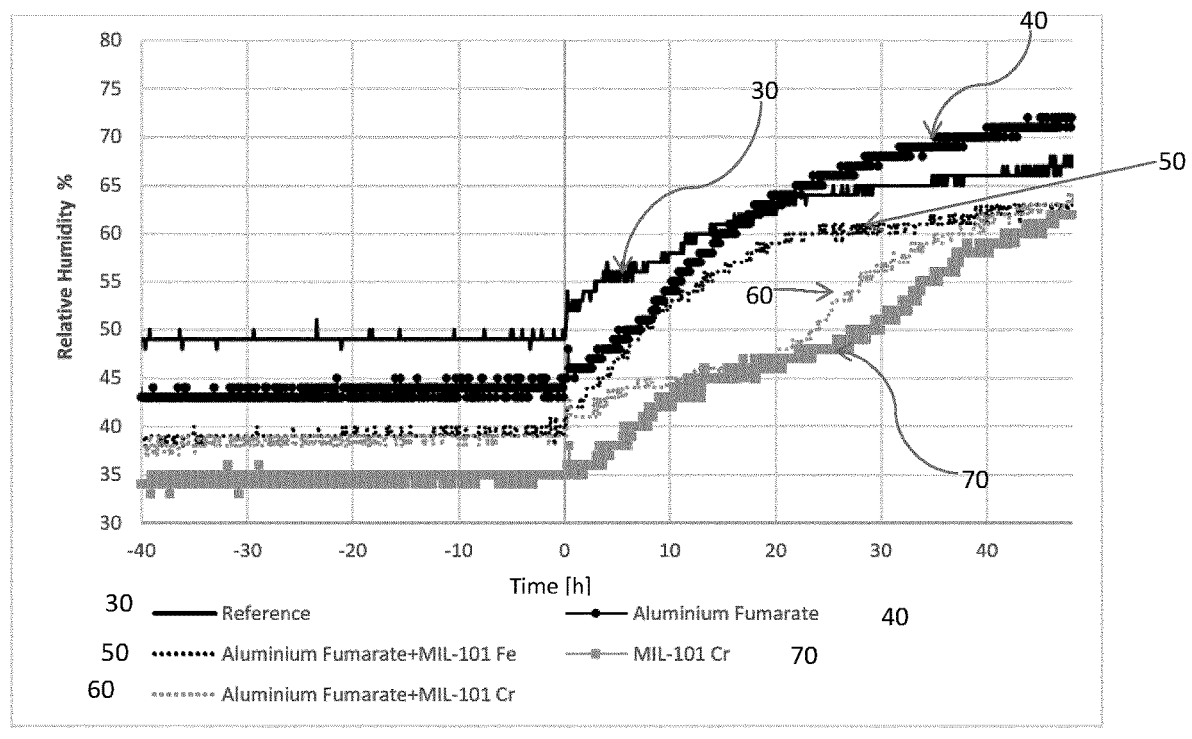
FIG. 5 shows the percent relative humidity over time of some of the packages prepared in the Examples.

FIG. 4 and FIG. 5 show the change of relative humidity inside the HEETS packages provided with different moisture regulating product and the corresponding HEETS packages void of moisture regulating product, from the moment they are sealed to the moment they are opened and kept for 48 hours at 30 Celsius and 75 percent relative humidity.

With reference to FIG. 4, curve 30 shows the change of percent relative humidity over time inside HEETS package without moisture regulating product, Example 15. Curve 301 shows the change of percent relative humidity over time inside HEETS package with the moisture regulating product of Example 20, Potassium Carbonate and Carboxyl Methyl Cellulose impregnated onto a support.

Curve 302 shows the change of percent relative humidity over time inside HEETS package with the moisture regulating product of Example 21, Potassium Carbonate and Carboxyl Methyl Cellulose coated onto a packaging material.

As it is clear form Curve 30 the level or relative humidity in a package void of moisture regulating product is higher than in the packages provided with a moisture regulating product.

At the first opening of the package void of moisture regulating product a sudden increase in the relative humidity percent is visible. The relative humidity inside the package increases almost constantly from the first opening to the end of the experiment. After 48 hours a relative humidity of about 68 percent is reached inside the package void of any moisture regulating product.

As clear from curve 30, in the package of Example 15 the relative humidity inside the package during storage is about 50 percent; once the package is opened, the relative humidity dramatically increases up to 75 percent after about 24 hours, which is the environmental relative humidity in the test. As it is clear from curve 30, the increase of relative humidity inside the package is not linear and relative humidity doesn't reach 75 percent instantaneously inside the packages, as the paperboard and part of the wrapping film left on the package act as a barrier and since part of the water vapour entering is adsorbed by the sticks.

As it is clear from curves 301 and 302, the level of humidity in packages provided with a moisture regulating product at the first opening is lower than the level of humidity in the package void of any moisture regulating product. Before the opening in the package of Example 20 a relative humidity of about 43 percent is reached. Before the opening in the package of Example 21 a relative humidity of about 39 percent is reached. Before the opening in the package void of any moisture regulating product a relative humidity of about 70 percent is reached After the first opening of the package the relative humidity increase also in the package provided with the moisture regulating product, nonetheless the increase in the relative humidity is lower when compared with the increase in the package void of moisture regulating product. Most of all, the value of relative humidity reached after 48 hours from the first opening is considerably lower than in the package void of any moisture regulating product.

After 48 hours from the first opening in the package of Example 20 a relative humidity of about 52 percent is reached, curve 301; after 48 hours from the first opening in the package of Example 21 a relative humidity of about 45 percent is reached, curve 302.

As Example 20 refers to a package containing a porous pouch comprising pure Potassium Carbonate and Carboxyl Methyl Cellulose whilst Example 21 refers to a package containing a sheet impregnated with Potassium Carbonate and Carboxyl Methyl Cellulose, the comparison of curves 301 and 302 also show that the impregnation is preferable.

It should be also noted that in Example 21 2.00 grams of Potassium Carbonate have been used whilst in Example 20 1.00 gram of Potassium Carbonate has been used.

Increasing the quantity of Potassium Carbonate and Carboxyl Methyl Cellulose, i.e. the quantity of moisture regulating product the absorption effect increases.

As it is clear from FIG. 4 the change of relative humidity inside the packages provided with Potassium Carbonate and Carboxyl Methyl Cellulose has a sigmoidal path after the opening of the packages.

Analysing the curves 30 301, 302, the influence of the Potassium Carbonate and Carboxyl Methyl Cellulose on the level of relative humidity on both closed and open packages is clearly visible. Compared to the reference, the relative humidity of packages with Potassium Carbonate and Carboxyl Methyl Cellulose is lower and the more Potassium Carbonate and Carboxyl Methyl Cellulose is the packages, the lower is relative humidity in the packages.

The change of relative humidity inside the packages with and without use of Metal-organic framework from the moment they are sealed to the moment they are opened and kept for two days at 30 Celsius and 75 percent relative humidity are illustrated in FIG. 5.

Curve 30 is the same reported in FIG. 4 and it is therefore indicated with the same reference number. Curve 30 shows the change of percent relative humidity over time inside HEETS package without moisture regulating product, Example 15. Curve 40 shows the change of percent relative humidity over time inside HEETS package with the moisture regulating product of Example 16, Aluminium Fumarate pure. Curve 50 shows the change of percent relative humidity over time inside HEETS package with the moisture regulating product of Example 18, Aluminium Fumarate 0.50 grams and MIL 101 Fe 0.50 grams. Curve 60 shows the change of percent relative humidity over time inside HEETS package with the moisture regulating product of Example 19, Aluminium Fumarate 0.50 grams and MIL 101 Cr 0.50 grams. Curve 70 shows the change of percent relative humidity over time inside HEETS package with the moisture regulating product of Example 17, MIL 101 Cr 1.00 gram.

As it is clear from Curve 30 the level of relative humidity in a package void of moisture regulating product is higher than in the packs provided with an adsorbing moisture regulating product.

At the first opening of the package void of Metal-organic framework a sudden increase in the relative humidity percent is visible.

The packages provided with at least Metal-organic framework have lower level of relative humidity in comparison with the packages void of Metal-organic framework. The packages of Examples 17, 18 and 19 maintain a level of humidity lower than the packages void of Metal-organic framework even after 48 hours from the first opening.

As clear from curve 30, in the package of Example 15 the relative humidity inside the package during storage is about 50 percent; once the package is opened, relative humidity dramatically increases up to 75 percent after about 24 hours, which is the environmental relative humidity in the test. As it is clear from curve 30, the increase of relative humidity inside the package is not linear and relative humidity doesn't reach 75 percent instantaneously inside the packages, as the paperboard and part of the wrapping film left on the package act as a barrier and since part of the water vapour entering is adsorbed by the sticks.

As it is clear from FIG. 5 the change of relative humidity inside the packages has a sigmoidal path after the opening of the packages.

Analysing the curves 40, 50, 60 and 70 the influence of the Metal-organic framework on the level of relative humidity on both closed and open packages is clearly visible. Compared to the reference, the relative humidity of packages with Metal-organic framework is lower and the more Metal-organic framework is the packages, the lower is relative humidity in the packages.

For example, the relative humidity obtained by the Example 18 is intermediate between the relative humidity obtained with Example 17 and 16.

Therefore, choosing and mixing different Metal-organic frameworks the relative humidity inside the packages may be adjusted.

In particular it is possible to adjust the minimum threshold relative humidity value and the maximum threshold relative humidity value and, thus, the adsorption portion of the sorption isotherm. It is possible to adjust the water adsorbed in the adsorption portion of the sorption isotherm from the moisture regulating product.

The water content of the of tobacco plug of the stick samples removed and analysed during the test at various time intervals was determined through Karl Fischer analysis. The results are visible in FIGS. 6 and 7 respectively for the packages of FIGS. 5 and 4.

The water content of the tobacco plug in the packages of the different Examples reflects the relative humidity of the corresponding packages of the same Examples.

Figure 6:
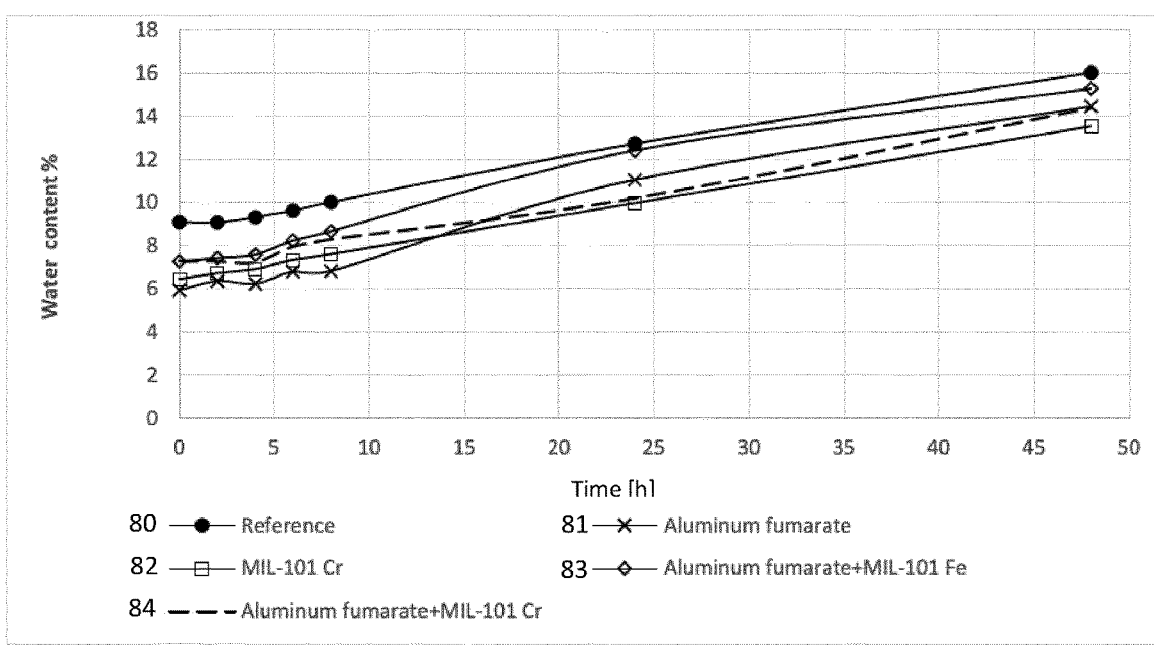
FIG. 6 shows the percent water content over time of the sample sticks in the packages of FIG. 5.

In FIG. 6 with 80 it is indicated the curve representing the water content of tobacco plug over time in the package of Example 15 void of Metal-organic framework; 81 is the curve representing the water content of tobacco plug over time in the package of Example 16 with 1.00 g of Aluminium Fumarate, 82 is the curve representing the water content of tobacco plug over time in the package of Example 17, 83 is the curve representing the water content of tobacco plug over time in the package of Example 18, 84 is the curve representing the water content of tobacco plug over time in the package of Example 19.

Comparing the curves of FIG. 6 it is clear that in the package provided with a moisture regulating product the water content of the tobacco plug is lower than the water content on the tobacco plug in the package void of any moisture regulating product, either before the first opening and also after the opening of the package.

As it is clear from FIG. 6 the water content in the tobacco plug of the package void of moisture regulating product is greater than the water content of the tobacco plug in the packages provided with a moisture regulating product. At the first opening, the water content of the tobacco plug in the package of Example 15 void of any moisture regulating product is greater than in the packages provided with a moisture regulating product. Even 48 hours after the first opening the water content of the tobacco plug in the package of Example 15 is higher than the water content of the packages of Examples 16-19 with a moisture regulating product.

In particular at the first opening the water content of the tobacco plug in the package void of any moisture regulating product, Example 15, is about 9.7 percent, the water content of the tobacco plug in the package of Example 16 with 1.00 gram of Aluminium Fumarate is about 6 percent, the water content of the tobacco plug in the package of Example 17 is about 7.3 percent, the water content of the tobacco plug in the package of Example 18 is about 7.3 percent, the water content of the tobacco plug in the package of Example 19 is about 6.5 percent.

After the opening of the packages the water content of the tobacco plugs increases in all the packages due to the high relative humidity of the environment.

At 48 hours after the first opening the moisture content of the tobacco plug in the package void of any moisture regulating product, Example 15, is about 16 percent, the water content of the tobacco plug in the package of Example 16 with 1.00 gram of Aluminium Fumarate is about 14.3 percent, the water content of the tobacco plug in the package of Example 17 is about 13.5 percent, the water content of the tobacco plug in the package of Example 18 is about 15.2 percent, the water content of the tobacco plug in the package of Example 19 is about 14.3 percent.

Figure 7:
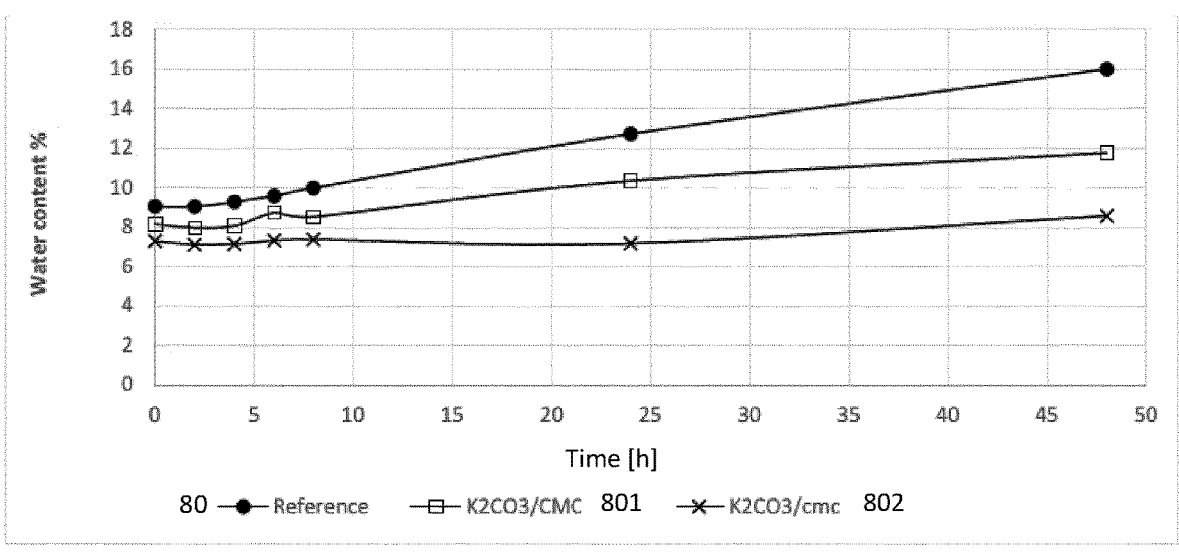
FIG. 7 shows the percent water content over time of some of the sample sticks in the packages of FIG. 4.

In FIG. 7 with 80 it is indicated the curve representing the water content of tobacco plug over time in the package of Example 15 void of any moisture regulating product, 801 is the curve representing the water content of tobacco plug over time in the package of Example 20 with 1 gram of Potassium Carbonate and 0.33 grams of Carboxyl Methyl Cellulose, 802 is the curve representing the water content of tobacco plug over time in the package of Example 21, 2.00 grams of Potassium Carbonate and 0.67 grams of Carboxyl Methyl Cellulose.

As it is clear from FIG. 7 the water content in the tobacco plug of the package void of moisture regulating product is greater than the water content of the tobacco plug in the packages provided with a moisture regulating product. At the first opening, the water content of the tobacco plug in the package of Example 21 with Potassium Carbonate and Carboxyl Methyl Cellulose impregnated on the support is lower than the water content of the package of Example 20 with pure Potassium Carbonate and Carboxyl Methyl Cellulose. Even 48 hours after the first opening the water content of the tobacco plug in the package of Example 21 with Potassium Carbonate and Carboxyl Methyl Cellulose impregnated on the support is lower than the water content of the package of Example 20 with pure Potassium Carbonate and Carboxyl Methyl Cellulose.

At the first opening of the package, the water content of the tobacco plug in the package of Example 21 is about 7.4 percent, the water content of the tobacco plug in the package of Example 20 is about 8 percent and the water content of the tobacco plug in the package of Example 15 is about 9.7 percent.

Therefore, in the package containing a moisture regulating product the moisture content of the tobacco plug is lower than in the package void of a moisture regulating product.

Table 2 reported below summarizes all results obtained for all Examples tested.

In Table 2 for each Example it is indicated in the first column the amount of active material. The definition active material refers here to the Metal-organic framework or Metal-organic frameworks or to the Potassium carbonate. In second column it is reported the percent relative humidity in the package before opening, in the third column it is reported the percent of water initial content before opening.

In the fourth column it is reported the time necessary for the stick to reach 11 percent of water content once the package has been opened under experimental conditions.

In the fifth column of Table 2 it is reported the percent relative humidity in the package after 48 hours at the experimental conditions: 30 Celsius and 75 percent relative humidity at a pressure of 1 atmosphere.

In the sixth column of Table 2 it is reported the percent water content in the stick after 48 hours at the experimental conditions, i.e. 30 Celsius and 75 percent relative humidity at a pressure of 1 atmosphere.

The results are summarised in the Table 2 reported below.

TABLE 2

| Sample | Active material (grams) | Relative humidity in the package before opening (Percent) | Initial water content (weight Percent) | Time to reach 11 weight percent water content (hour) | Relative humidity in package after 48 hours at 30 Celsius, 75 RH (percent) | Water content after 48 hours at 30 Celsius, 75 percent RH (weight percent) |
|---|---|---|---|---|---|---|
| Example 1 | 0.00 | 48.7 | 9.7 | 6 | 72 | 17.3 |
| Example 2 | 0.20 | 45 | 8.6 | 10 | 70 | 17.2 |
| Example 3 | 0.30 | 41.9 | 7.8 | 11.5 | 69 | 16.5 |
| Example 4 | 0.90 | 28.9 | 5.8 | 17.5 | 69 | 15.7 |
| Example 5 | 0.00 | 50 | 10.0 | 3.2 | 72 | 19.6 |
| Example 6 | 0.20 | 45 | 9.7 | 4.6 | 72 | 19.4 |
| Example 7 | 0.50 | 43 | 9.7 | 5.2 | 72 | 19.2 |
| Example 8 | 1.00 | 42 | 9.3 | 5.8 | 71 | 19.1 |
| Example 9 | 0.20 | 49.1 | 9.9 | 3 | 72 | 19.6 |
| Example 10 | 0.50 | 49 | 10.0 | 3 | 72 | 19.0 |
| Example 11 | 1.00 | 47 | 9.7 | 3.4 | 71 | 19.1 |
| Example 12 | 0.00 | 47 | 8.4 | 8.2 | 71 | 18.2 |
| Example 13 | 0.50 | n/a | 9.4 | 7.2 | n/a | 16.0 |
| Example 14 | 0.90 | 41 | 7.1 | 23 | 67 | 16.0 |
| Example 15 | 0.00 | 49 | 9.1 | 13 | 70 | 16.0 |
| Example 16 | 1.00 | 44 | 5.9 | 24 | 67 | 14.4 |
| Example 17 | 1.00 | 35 | 6.4 | 32 | 62 | 13.5 |
| Example 18 | 1.00 | 39 | 7.3 | 16 | 63 | 15.3 |
| Example 19 | 1.00 | 39 | 7.3 | 27 | 63 | 14.4 |
| Example 20 | 1.00 | 43 | 8.2 | 33 | 51 | 11.8 |
| Example 21 | 2.00 | 40 | 7.3 | >48 | 44 | 8.6 |

48 hours after the first opening the water content of the tobacco plug in the package of Example 21 is about 8 percent, the water content of the tobacco plug in the package of Example 20 is about 12 percent and the water content of the tobacco plug in the package of Example 15 is about 16 percent.

Over time the difference in absorbing water and thus in the water content of the tobacco plug between the HEETS packages of the different Examples is even more evident.

In the package provided with Potassium Carbonate and Carboxyl Methyl Cellulose the humidity is absorbed, and the water content of the tobacco plug is lower than the water content of the tobacco plug of the other packages.

The package with the Potassium Carbonate and Carboxyl Methyl Cellulose impregnated onto the support is very effective in absorbing water.

The prepared moisture regulating products exhibit a sigmoidal shape of the adsorption isotherm.

The adsorption isotherm of the prepared moisture regulating products display a sudden and sharp increase in adsorbed water following the increase of the relative humidity, i.e. opening of the packages at experimental conditions.

Choosing the Metal-organic framework or the Metal-organic frameworks and/or the carbonate or carbonates and/or the inorganic salt or inorganic salts, and/or the binder or binders, the adsorption behaviour of the moisture regulating product may be tailored to a desired need and level of relative humidity and level of moisture content of the product packaged in the package. Choosing the Metal-organic framework or the Metal-organic frameworks, and/or the inorganic salt or inorganic salts, and/or the carbonate and/or the binder or binders used in the moisture regulating product, the level of relative humidity is adjusted, at which the moisture regulating product absorbs water and therefore the relative humidity in the package or the water content of the product packaged in the package containing the moisture regulating product.

Therefore, depending on the HEETS packages, it is possible to use a particular moisture regulating product which is suitable to keep the desired level of relative humidity in the package and desired level of moisture content in the product.

Therefore, depending on the different tobacco or nicotine containing product, it is possible to use a particular moisture regulating product which is suitable to keep the desired level of moisture content in the tobacco or nicotine containing product.

Knowing the desired level of moisture content of a tobacco or nicotine containing product, it is possible to choose the moisture regulating product allowing the desired level of moisture content to be maintained.

A too high desiccation of the tobacco or nicotine containing product and also a too high moistening of the tobacco or nicotine containing product are avoided.

Tests have also demonstrated that even small quantities of moisture regulating product effectively maintain the relative humidity in a package and the moisture content of a product within a desired range.

The water content of the sample stick from the package of Example 15, void of any moisture regulating product, was 9.1 percent at package opening and gradually increase to 16 percent over a 48 hours period. In the packages containing moisture regulating product, Examples 16-21, the values of moisture content after 48 from first opening are considerably lower.

At the first opening, in the package containing 1.33 gram of Potassium Carbonate and Carboxyl Methyl Cellulose, the water content was found to be 8.2 percent, in the package containing 2.67 grams of Potassium Carbonate and Carboxyl Methyl Cellulose, the water content was found to be 7.3 percent.

After 48 hours from the first opening of the package containing 1.33 gram of Potassium Carbonate and Carboxyl Methyl Cellulose, the water content was found to be 11.8 percent; in the package containing 2.67 grams of Potassium Carbonate and Carboxyl Methyl Cellulose, the water content was found to be 8.6 percent.

These results clearly show that the Potassium Carbonate and Carboxyl Methyl Cellulose have a great capacity of absorption once the packages are opened, while not changing the initial water content of the sticks at first opening to a great extent in relation to the values for packages void of moisture regulating product.

Using 1.00 gram of Metal-organic framework based material or mixes thereof also impact the stick water content in a similar way, lowering the overall water content before and after opening of the packs in experimental conditions.

Tests also demonstrates that the effect of adsorbing water may be obtained either by impregnating the moisture regulating product on a packaging material and by coating the moisture regulating product on a packaging material and also applying the moisture regulating product into a porous pouch.

Tests have also demonstrated that an existing conventional HEETS package may be improved by adding a packaging material provided with a moisture regulating product.

Tests also demonstrated that choosing the moisture regulating product it is possible to adjust the moisture content of the tobacco or nicotine containing product to a desired level which could be also different for the different tobacco or nicotine containing products.

The moisture regulating product acts to create an active layer that can be tuned to absorb a certain amount of water, and above a certain minimum threshold value of relative humidity.

Hence by selecting the right moisture regulating product, and selecting the desired mix of Metal-organic framework or Metal-organic frameworks and of the at least one inorganic salt or inorganic salts, and/or of the at least one carbonate or carbonates, and/or binder or binders it is possible to obtain an adsorption isotherm having a desired S-shape. It is possible to obtain the adsorption isotherm that fits the desired moisture content of the tobacco or nicotine containing product.

Additionally, by selecting the right moisture regulating product and selecting the desired mix of Metal-organic framework or Metal-organic frameworks and/or of the at least one inorganic salt or inorganic salts, and/or of the at least one carbonate or carbonates, and/or binder or binders it is possible to obtain a moisture regulating product and thus a packaging material that does not alter the water content of the tobacco or nicotine containing product in an undesirable way.

It is possible to obtain a moisture regulating product adsorbing water at a relative humidity higher than a minimum threshold value. It is possible to avoid a too high desiccation of the tobacco or nicotine containing product during shelf life, i.e. before first opening.

The invention claimed is:

1. A package of a tobacco or nicotine containing product comprising a packaging material having a moisture regulating product, the moisture regulating product comprising at least one binder and at least one Metal-organic framework compound and at least one inorganic salt, wherein the at least one inorganic salt is chosen in a group consisting of natrium chloride, calcium chloride, carbonates, and any combination thereof, wherein the moisture regulating product comprises 20-60 weight percent on total dry weight basis of the at least one Metal-organic framework compound and of the at least one inorganic salt and 80-40 weight percent on total dry weight basis of the at least one binder.

2. The package according to claim 1, wherein the moisture regulating product further comprises a binder chosen in a group consisting of: starch $((C_6H_{10}O_5)n-(H_2O))$, carboxymethyl cellulose (CMC, $C_6H_7O_2(OH)2CH_2COONa$), alginic acids $((C_6H_8O_6)n)$, alginates, copolymers of polyacrylic acid $((C_3H_4O_2)n)$, copolymers of methacrylic acid $(C_4H_6O_2)$, polymers and/or copolymers of maleic acid $(HO_2CCH=CHCO_2H)$, polyaspartic acid $((C_4H_5NO_3)n)$, hydroxyethylcellulose $(C_{29}H_{52}O_{21})$, hydroxypropylcellulose $(C_{36}H_{70}O_{19})$, polyvinylalcohol $((C_2H_{4O})x)$, polyvinylalcohol-co-ethylene (EVOH, $C_4H_{8O}$), polyvinylalcohol-co-vinyl acetate, polyethylene oxide $((-CH_2CH_2O-)n)$, polyethyleneoxide-co-propyleneoxide, and any combination thereof.

3. The package according to claim 1, wherein the ratio between the weight of the at least one Metal-organic framework and/or the at least one inorganic salt to the weight of the binder in the packaging material is comprised between 1:4 and 3:2.

4. The package according to claim 1, wherein the package comprises an amount of the moisture regulating product comprised between 0.30 and 5.00 grams.

5. The package according to claim 1, wherein the at least one Metal-organic framework compound is chosen in a group consisting of:

Aluminium Fumarate ($C_{12}H_6Al_2O_{12}$), chromium terephthalate Metal-organic frameworks MIL-101(Cr), comprising trimeric chromium (III) octahedral clusters interconnected by 1,4-benzenedicarboxylates and having empirical formula [$Cr_3(O)X(bdc)_3$ $(H_2O)_2$], wherein bdc is benzene-1,4-dicarboxylate and X is OH or F, functionalized chromium terephthalate Metal-organic frameworks MIL-101(Cr)—X, where X denotes an electron withdrawing (NO2, $SO_3H$ or Cl) or electron donor ($NH_2$ or $CH_3$) group, iron terephthalate Metal-organic frameworks MIL-101 (Fe), chromium-based Metal-organic frameworks with underlying soc topology Cr-soc-Metal-organic framework-1 with chemical formula [$Cr_3(\mu 3$-$O)(H_2O)2$ (TCPT)1.5Cl] where TCPT is tetratopic 3,3",5,5"-tetrakis(4-carboxyphenyl)-p-terphenyl ligand, isostructural Zr(IV)-MOFs with rare low-symmetric 9-connected Zr6 MOFs, indicated as Zr(IV)-MOFs BUT-46F, BUT-46A, BUT-46W, and BUT-46B, hybrid microporous highly connected rare-earth-based Metal-organic frameworks Y-shp-MOF-5, where "shp" denotes square hexagonal prism; and any combination thereof.

6. The package according to claim 1, wherein the package comprises about 1.00 gram±20% of Aluminium Fumarate, or about 0.20 grams±20% of Aluminium Fumarate, or about 0.30 grams±20% of Aluminium Fumarate, or about 1.00 gram±20% of MIL-101(Cr), or about 0.20 grams±20% of MIL-101(Cr), or about 0.50 grams±20% of MIL-101(Cr), or about 1.00 gram±20% of MIL-101(Fe), or about 0.20 grams±20% of MIL-101(Fe), or about 0.50 grams±20% of MIL-101(Fe), or about 0.50 grams±20% of MIL-101(Cr) and about 0.50 grams±20% of Aluminium Fumarate, or about 0.50 grams±20% of MIL-101(Fe) and about 0.50 grams±20% of Aluminium Fumarate, or 1.00 gram±20% of Potassium Carbonate mixed with 0.33 grams±20% of Carboxyl Methyl Cellulose, or 0.50 grams±20% of Potassium Carbonate mixed with 0.16 grams±20% of Carboxyl Methyl Cellulose, or about 2.00 grams±20% of Potassium Carbonate mixed with 0.67 grams±20% of Carboxyl Methyl Cellulose, or about 0.50 grams±20% of Potassium Carbonate and about 0.50 grams±20% of MIL-101(Cr) and/or Aluminium Fumarate.

7. The package according to claim 1, wherein the packaging material comprises an amount of the moisture regulating product comprised between 20-300 grams per square meter.

8. The package according to claim 1, wherein the packaging material is chosen in a group consisting of fibre-based material or plastics material.

9. The package according to claim 1, wherein the packaging material is a foamed packaging material.

10. The package according to claim 1, wherein the packaging material provided with the moisture regulating product is integrated in a plurality of different packaging elements of the package, the packaging element comprising a hinge lid, an inner frame, an inner liner or a pad or a porous pouch inserted in the package.

11. A package of a tobacco or nicotine containing product comprising a packaging material having a moisture regulating product, wherein the moisture regulating product comprises at least one binder and at least one carbonate and wherein the moisture regulating product further comprises at least one Metal-organic framework, wherein the moisture regulating product comprises 70-80 weight percent on total dry weight basis of the at least one carbonate and 30-20 percent weight percent on total dry weight basis of the at least one binder.

12. The package according to claim 11, wherein the at least one carbonate is Potassium Carbonate, or comprises Potassium Carbonate and at least one different inorganic salt.

13. The package according to claim 11, wherein the moisture regulating product further comprises a binder chosen in a group consisting of: starch (($C_6H_{10}O_5$)n-($H_2O$)), carboxymethyl cellulose (CMC, $C_6H_7O_2$(OH) $2CH_2COONa$), alginic acids (($C_6H_8O_6$)n), alginates, copolymers of polyacrylic acid (($C_3H_4O_2$)n), copolymers of methacrylic acid ($C_4H_6O_2$), polymers and/or copolymers of maleic acid ($HO_2CCH$=$CHCO2H$), polyaspartic acid (($C_4H_5NO_3$)n), hydroxyethylcellulose ($C_{29}H_{52}O_{21}$), hydroxypropylcellulose ($C_{36}H_{70}O_{19}$), polyvinylalcohol (($C_2H_{4O}$)x), polyvinylalcohol-co-ethylene (EVOH, $C_4H_{8O}$), polyvinylalcohol-co-vinyl acetate, polyethylene oxide ((—$CH_2CH_2O$-)n), polyethyleneoxide-co-propyleneoxide, and any combination thereof.

14. The package according to claim 11, wherein the package comprises an amount of the moisture regulating product comprised between 0.30 and 5.00 grams.

15. The package according to claim 14, wherein the ratio between the weight of the at least one Metal-organic framework and/or the at least one carbonate to the weight of the binder in the packaging material is comprised between 1:4 and 3:2.

16. The package according to claim 11, wherein the at least one Metal-organic framework is chosen in a group consisting of:

Aluminium Fumarate ($C_{12}H_6Al_2O_{12}$), chromium terephthalate Metal-organic frameworks MIL-101(Cr), comprising trimeric chromium (III) octahedral clusters interconnected by 1,4-benzenedicarboxylates and having empirical formula [$Cr_3(O)X(bdc)_3$ $(H_2O)_2$], wherein bdc is benzene-1,4-dicarboxylate and X is OH or F, functionalized chromium terephthalate Metal-organic frameworks MIL-101(Cr)—X, where X denotes an electron withdrawing (NO2, $SO_3H$ or Cl) or electron donor ($NH_2$ or $CH_3$) group, iron terephthalate Metal-organic frameworks MIL-101 (Fe), chromium-based Metal-organic frameworks with underlying soc topology Cr-soc-Metal-organic framework-1 with chemical formula [$Cr_3(\mu 3$-$O)(H_2O)2$(TCPT) 1.5Cl] where TCPT is tetratopic 3,3",5,5"-tetrakis(4-carboxyphenyl)-p-terphenyl ligand, isostructural Zr(IV)-MOFs with rare low-symmetric 9-connected Zr6 MOFs, indicated as Zr(IV)-MOFs BUT-46F, BUT-46A, BUT-46W, and BUT-46B, hybrid microporous highly connected rare-earth-based Metal-organic frameworks Y-shp-MOF-5, where "shp" denotes square hexagonal prism; and any combination thereof.

17. The package according to claim 11, wherein the package comprises about 1.00 gram±20% of Aluminium Fumarate, or about 0.20 grams±20% of Aluminium Fumarate, or about 0.30 grams±20% of Aluminium Fumarate, or about 1.00 gram±20% of MIL-101(Cr), or about 0.20 grams±20% of MIL-101(Cr), or about 0.50 grams±20% of MIL-101(Cr), or about 1.00 gram±20% of MIL-101(Fe), or about 0.20 grams±20% of MIL-101(Fe), or about 0.50 grams±20% of MIL-101(Fe), or about 0.50 grams±20% of MIL-101(Cr) and about 0.50 grams±20% of Aluminium Fumarate, or about 0.50 grams±20% of MIL-101(Fe) and about 0.50 grams±20% of Aluminium Fumarate, or 1.00 gram±20% of Potassium Carbonate mixed with 0.33 grams±20% of Carboxyl Methyl Cellulose, or 0.50 grams±20% of Potassium Carbonate mixed with 0.16 grams±20% of Carboxyl Methyl Cellulose, or about 2.00 grams±20% of Potassium Carbonate mixed with 0.67 grams±20% of Carboxyl Methyl Cellulose, or about 0.50 grams±20% of Potassium Carbonate and about 0.50 grams±20% of MIL-101(Cr) and/or Aluminium Fumarate.

18. A method for preparing a packaging material of a package of a tobacco or nicotine containing product, wherein the packaging material comprises a moisture regulating product and wherein the moisture regulating product comprises at least one Metal-organic framework and at least one binder bounded to the at least one Metal-organic framework, the method comprising the following steps:

providing a packaging material;

providing an impregnating bath containing a moisture regulating solution having a moisture regulating product comprising 20-60 weight percent on total dry weight basis of at least one Metal-organic framework compound and 80-40 weight percent on total dry weight basis of at least one binder material, and a solvent;

immersing the packaging material into the impregnating bath until the packaging material is uniformly saturated with the moisture regulating solution of the impregnating bath and drying the packaging material to evaporate the solvent from the packaging material so as to obtain a packaging material having a moisture content comprised between 0 and 25 weight percent based on the weight of the at least one Metal-organic framework without water.

19. The method according to claim 18, wherein the binder is chosen in a group consisting of: starch $((C_6H_{10}O_5)n-$ $(H_2O))$, carboxymethyl cellulose (CMC, $C_6H_7O_2(OH)$ $2CH_2COONa)$, alginic acids $((C_6H_8O_6)n)$, alginates, copolymers of polyacrylic acid $((C_3H_4O_2)n)$, copolymers of methacrylic acid $(C_4H_6O_2)$, polymers and/or copolymers of maleic acid $(HO_2CCH{=}CHCO2H)$, polyaspartic acid $((C_4H_5NO_3)n)$, hydroxyethylcellulose $(C_{29}H_{52}O_{21})$, hydroxypropylcellulose $(C_{36}H_{70}O_{19})$, polyvinylalcohol $((C_2H_{4O})x)$, polyvinylalcohol-co-ethylene (EVOH, $C_4H_{8O})$, polyvinylalcohol-co-vinyl acetate, polyethylene oxide $((-CH_2CH_2O-)n)$, polyethyleneoxide-co-propyleneoxide, and any combination thereof.

20. A method for preparing a packaging material of a package of a tobacco or nicotine containing product, wherein the packaging material comprises a moisture regulating product, and wherein the moisture regulating product comprises at least one carbonate salt and at least one binder bound to the at least one carbonate, the method comprising the following steps:

providing a packaging material;

providing an impregnating bath of a moisture regulating solution containing a moisture regulating product comprising: 20-80 weight percentage on total dry weight basis of at least one carbonate and 80-20 weight percentage on total dry weight basis of at least one binder, and a solvent;

immersing the packaging material into the impregnating bath until the packaging material is uniformly saturated with the moisture regulating solution of the impregnating bath and drying the packaging material to evaporate the solvent from the packaging material so as to obtain a packaging material having a moisture content comprised between about 0 and 25 weight percent based on the weight of the at least one Metal-organic framework without water.

\* \* \* \* \*